United States Patent [19]

Okabe et al.

[11] Patent Number: 4,948,006
[45] Date of Patent: Aug. 14, 1990

[54] CONTAINER WITH METALLIC COVER AND METHOD OF MANUFACTURING THE SAME

[75] Inventors: Mitsuo Okabe, Yokohama; Kimiaki Hyakutome; Hideto Akiba, both of Sayama, all of Japan

[73] Assignee: Dai Nippon Insatsu Kabushiki Kaisha, Japan

[21] Appl. No.: 236,527

[22] PCT Filed: Dec. 2, 1987

[86] PCT No.: PCT/JP87/00936

§ 371 Date: Sep. 1, 1988

§ 102(e) Date: Sep. 1, 1988

[87] PCT Pub. No.: WO88/04262

PCT Pub. Date: Jun. 16, 1988

[30] Foreign Application Priority Data

Dec. 2, 1986 [JP] Japan ................ 61-287438
May 14, 1987 [JP] Japan ................ 62-117723
Jul. 22, 1987 [JP] Japan ................ 62-183156

[51] Int. Cl.$^5$ .................. B65D 41/42; B21D 51/32
[52] U.S. Cl. ........................ 220/67; 53/453; 53/478; 156/228; 264/320; 413/5; 425/403.1
[58] Field of Search ............ 53/453, 456, 471, 478; 220/66, 67, 70, 79, 309, 310; 264/320, 322, 323; 425/403.1; 413/5; 156/228

[56] References Cited

U.S. PATENT DOCUMENTS

| 2,753,088 | 7/1956 | Prahl, Jr. ................ | 220/67 |
|---|---|---|---|
| 3,405,439 | 10/1968 | Uemura ................ | 220/67 |
| 3,410,939 | 11/1968 | Driza et al. ............ | 220/67 |
| 3,432,071 | 3/1969 | Burns et al. ........... | 220/66 |
| 3,491,936 | 1/1970 | Fox ........................ | 220/67 |
| 3,524,568 | 8/1970 | Nughes .................. | 220/67 |
| 3,558,001 | 1/1971 | Fritz et al. ............. | 220/67 |
| 3,668,034 | 6/1972 | Nicholas et al. ....... | 156/245 |
| 3,685,685 | 8/1972 | Phillips .................. | 220/67 |
| 3,709,399 | 1/1973 | Nughes .................. | 220/67 |
| 3,912,154 | 10/1975 | Godar .................... | 220/67 |
| 3,923,190 | 12/1975 | Roth ...................... | 220/67 |
| 3,931,385 | 1/1976 | Sutch .................... | 229/1.5 B |
| 4,102,467 | 7/1978 | Woodley ................ | 220/67 |
| 4,122,147 | 10/1978 | Vrcelj ..................... | 264/323 |
| 4,125,632 | 11/1978 | Vosti et al. ............. | 220/66 |
| 4,349,400 | 9/1982 | Gilden ................... | 229/1.5 B |
| 4,354,996 | 10/1982 | Nishiyama et al. ..... | 264/322 |
| 4,419,320 | 12/1983 | Perkins et al. ......... | 264/323 |
| 4,522,779 | 6/1985 | Jabarin ................... | 264/530 |
| 4,526,290 | 7/1985 | Cerny .................... | 220/67 |
| 4,624,722 | 11/1986 | Nowicki ................ | 156/232 |
| 4,665,682 | 5/1987 | Kerins et al. ........... | 264/37 |

FOREIGN PATENT DOCUMENTS

| 0036464 | 12/1964 | Japan . |
|---|---|---|
| 0098265 | 2/1975 | Japan . |
| 0035916 | 10/1976 | Japan . |
| 0128952 | 10/1977 | Japan . |
| 0056093 | 12/1980 | Japan . |
| 0024110 | 3/1981 | Japan . |
| 0075819 | 6/1981 | Japan . |
| 0137917 | 10/1981 | Japan . |
| 0098315 | 6/1982 | Japan . |
| 0047157 | 10/1982 | Japan . |
| 0178816 | 11/1982 | Japan . |
| 0124611 | 7/1983 | Japan . |
| 0199435 | 11/1984 | Japan . |
| 0052219 | 4/1985 | Japan . |
| 1348370 | 3/1974 | United Kingdom ............ 229/1.5 B |

*Primary Examiner*—Jimmy G. Foster
*Attorney, Agent, or Firm*—Arnold, White & Durkee

[57] ABSTRACT

This invention relates to a container with a metallic cover, including a container body having a plastic flanged portion and a metallic cover provided with a peripheral edge which is roll-seamed around the flanged portion. A method of manufacturing the container is also disclosed. The method includes the steps of applying as a coating a heat sealing compound onto an inner surface of the peripheral edge of the metallic cover, roll-seaming the metallic cover around the flanged portion of the plastic container body, and fusing the flanged portion and the peripheral edge by heating to mutually secure the flanged portion and the peripheral edge of the metallic cover. An apparatus for manufacturing the container is also disclosed. The apparatus includes a cavity structure provided with an upper edge portion upwardly extending from an upper end of an outer periphery of the cavity structure, a plug for pressing a plastic sheet into the cavity, and a clamp for abutting against the upper edge portion of the cavity for clamping the plastic sheet. The upper edge portion of the cavity upwardly extends with an inclination of $5° < \theta < 40°$, and a distance $l$ between the upper end of the outer periphery of the cavity structure and the inner peripheral surface of the clamp is $5 \text{ mm} < l < 10 \text{ mm}$.

24 Claims, 19 Drawing Sheets

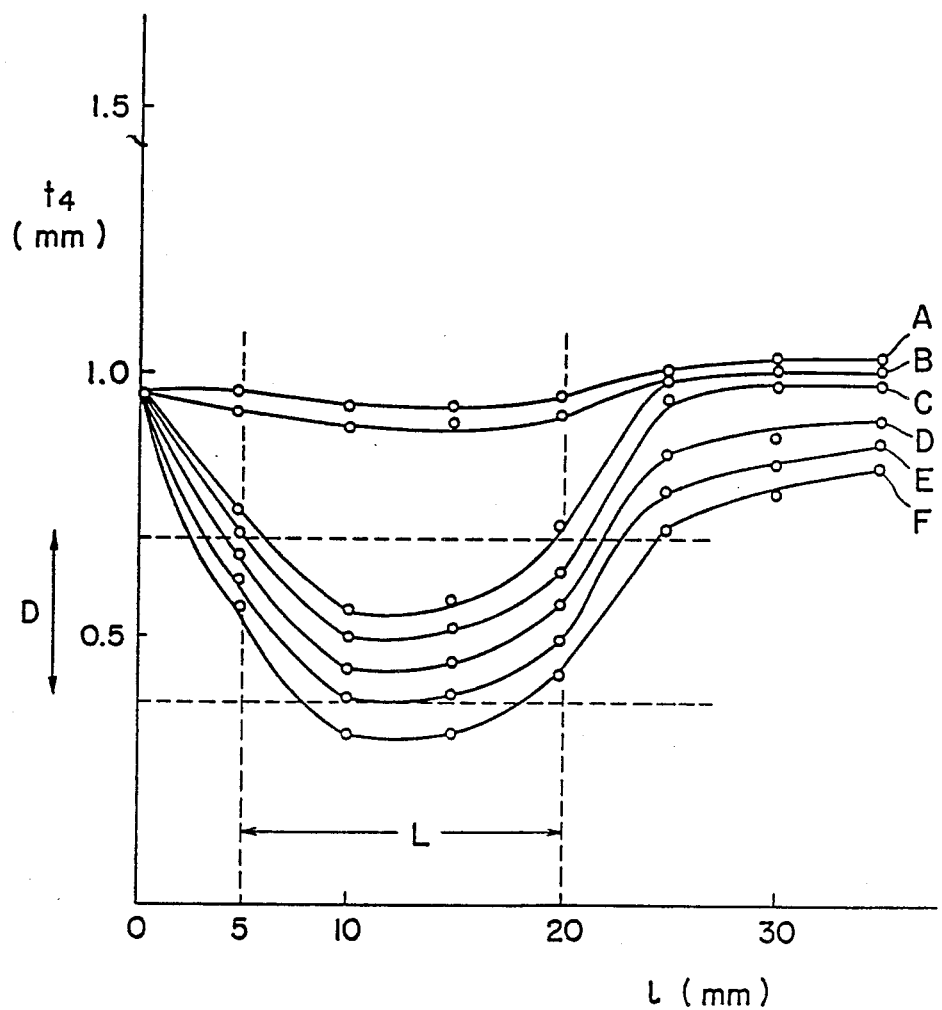
F I G. 54

CONTAINER WITH METALLIC COVER AND METHOD OF MANUFACTURING THE SAME

Technical Field

This invention relates to a container with a metallic top or cover comprising a container body provided with a flanged portion made of a plastic material and a metallic cover roll-seamed around the container body and also relates to a method of manufacturing the same.

Background Art

Metallic containers, for example, metallic cans have various shapes and can be classified into three-piece cans and two piece cans. The three-piece can is called a tinplate-soldered can which has a structure in which a cylindrical can body, a top or cover, and an end are double seamed and sealed. The two-piece can is called a tinplate-pressed can which has a structure in which a can body and an end portion (container body) are formed integrally and a cover is double seamed around the rim of the integral container body to seal the same.

These metallic cans are used as food packaging containers for packaging various foods, juices, soft drinks, dry foods and the like and are thus rigid containers of particular excellence in sealing and preservation properties. However, metallic cans have the following points to be improved.

(1) There is a limitation to making the weight light because of the nature of the metallic can;
(2) There is no self-restorative capability if the can is once crushed under an impact and the can is deformed;
(3) High energy cost is required for manufacturing the metallic can in comparison with a plastic container;
(4) The display effect of the outer appearance of the container cannot be freely changed in case the container is made of a metallic material and the display is only carried out by a printing operation; and
(5) It is impossible to manufacture a transparent container the content of which can be verified without opening the container.

For solving these problems or drawbacks of the conventional metallic cans described hereinabove, a container with a metallic cover in which a metallic cover is secured to a plastic container body is conceivable.

It is however difficult to secure a metallic top or cover to a plastic container body simply and air-tightly.

Disclosure of Invention

A first object of this invention is to provide a container provided with a metallic cover and comprising a plastic container body and a metallic cover which can be manufactured simply and air-tightly.

A second object of this invention is to provide a method of manufacturing a container with a metallic cover in which the metallic cover can be secured to the plastic container body with good air-tightness.

A third object of this invention is to provide a method of manufacturing a container with -a metallic cover having ample buckling strength and heat resistance to withstand the force applied when the metallic cover is roll-seamed around the plastic container body.

The fourth object of this invention is to provide a method of manufacturing a container with a metallic cover which is capable of ensuring positive securing of the metallic cover to the plastic container body, and which is suitable for mass production.

A fifth object of this invention is to provide a method of manufacturing a container with a metallic cover by which the plastic container body can be formed into a true spherical shape.

A sixth object of this invention is to provide an apparatus for manufacturing a container with a metallic cover capable of easily manufacturing a plastic container body suitable for being easily roll-seamed with the metallic cover.

(1) A first feature of this invention resides in a container with a metallic cover comprising a container body 14 provided with a plastic flanged portion 15 and a metallic cover 11 having a peripheral edge portion 12 which is to be roll-seamed around and with the flanged portion 15.

(2) A second feature of this invention resides in a method of manufacturing a container with a metallic cover comprising the steps of applying a coating of a heat-sealing compound 13 prepared from more than one of a denatured polyolefin, an ionomer resin, and an ethylene-acrylic acid copolymer on the inner surface of the peripheral edge portion 12 of the metallic cover, roll-seaming the metallic cover 11 around a flanged portion 15 of a container body 14, and fusing the flanged portion 15 and the peripheral edge portion 12 of the metallic cover 11 by a heating method utilizing high frequencies, ultrasonic waves, electric heating power or steam to secure these members to each other.

(3) A third feature of this invention resides in a method of manufacturing a container with a metallic cover characterized by thermal formation in which a container body is thermally formed by using a sheet blank including a polyethylene-terephthalate layer including a promotive nucleus of crystallization and the crystallization of the polyethylene-terephthalate layer is 10 to 40%.

(4) A fourth feature of this invention resides in a method of manufacturing a container with a metallic cover comprising the steps of thermally forming a container body 14 made of a plastic material and having a flanged portion 15 formed by a sheet forming method, thermally pressing the flanged portion 15 of the container body to decrease the thickness of the flanged portion 15, punching out the peripheral portion of the flanged portion 15 so as to make constant the width of the flanged portion 15, and roll-seaming the peripheral edge portion 12 of the metallic cover 11 around the flanged portion 15.

(5) A fifth feature of this invention resides in a method of manufacturing a container with a metallic cover into a spherical shape comprising the steps of filling a content in a plastic container body 14 provided with a flanged portion 15, roll-seaming airtightly the peripheral portion 12 of the metallic cover 11 around the flanged portion 15, and heating the container body 14 to a temperature above the glass transition point and below the melting point of the container body 14.

(6) A sixth feature of this invention resides in an apparatus for manufacturing a container with a metallic cover comprising a cavity 104 provided with an upper end 102 of an outer periphery from which an upper edge portion 103 of the cavity extends upwardly, a plug 106 for pressing a plastic sheet into the cavity 104, and a clamp 105 for clamping the plastic sheet in abutting condition against the upper edge portion 103 of the cavity 104, and in which the upper edge portion 103 extends upwardly with an inclination of 5°<θ<40°, and the distance between the upper end 102 of the outer periphery of the cavity and the inner peripheral surface of the clamp 105 is 5 mm <l<20 mm.

Brief Description of the Drawings

FIGS. 52 to 54 are views showing an apparatus for manufacturing a container with a metallic cover according to this invention.

Best Modes for Practicing the Invention

Figure 1A:
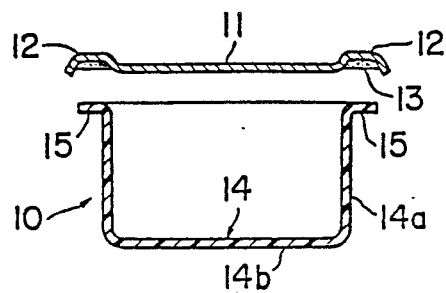
FIGS. 1a, 1b, 1c, to FIG. 3 are views showing a container with a metallic cover provided with a heat sealing compound of a first embodiment of this invention.

§1. First Embodiment of Container with Metallic Cover (Container with a metallic cover provided with a heat sealing compound)

1-1 Basic Structure

The structure of the first embodiment of a container with a metallic cover according to this invention is shown in FIGS. 1a, 1b and 1c to FIG. 3.

The container 10 with the metallic cover is manufactured by coating a heat sealing compound 13 made of one or more than one kind of denatured polyolefin ionomer resins and ethylene-acrylic acid copolymers on the inner surface of a peripheral edge 12 of a metallic cover 11, roll-seaming the peripheral edge 12 of the thus coated metallic cover to a flanged portion 15 of a container body 14 made of plastic material and thereafter fusing and bonding the flanged portion 15 of the container body 14 and the peripheral portion 12 of the metallic cover 11 by heating with high frequency, ultrasonic waves, electric heat or steam.

The plastic container body 14 used for this embodiment is not necessarily limited to a specific material and the container body made of other materials having stiffness and strength sufficient for withstanding the rolling and clamping operation and a laminated material mainly made of olefin resin or polypropylene are acceptable. Preferably, a container body 14 having a flanged portion 15 to be double seamed as disclosed in Japanese Patent Application No. 194850/1986 of the same applicant, is utilized. The container body 14 disclosed consists essentially of a cylindrical body portion 14a including the flanged portion 15 and an integrally formed end or bottom portion 14b, the flanged portion 15 having a thickness of 0.2–1.0 mm and a width of 1.0–2.5 mm. The container body 14 of such character can be molded by a two-stage molding method by using a mold provided with a stepped portion 18 capable of forming the flanged portion 15 having the dimensions described above in a cavity 17.

It is desired to use, as a main component of the heat sealing compound for applying the coating on the inner surface of the peripheral edge 12 of the metallic cover 11, a denatured polyolefin resin, ionomer resin and ethylene-acrylic acid copolymer, and preferably, the denatured polyolefin resin.

As the olefin, a homopolymer of α-olefins such as ethylene or propylene, a copolymer of α-olefin and other α-olefins such as ethylene-propylene random copolymer or mutual crystalline copolymer such as ethylene-butene 1 copolymer and ethylene-propylene-butene 1 copolymer, or a mixture of these copolymers is utilized. The denaturing method is performed by a graft copolymerization of an unsaturated carboxylic acid or anhydride to the above described polyolefin. As the unsaturated carboxylic acid or anhydride is used an acrylic acid, maleic acid, fumaric acid, itaconic acid, crotonic acid, citraconic acid, sorbic acid, or the anhydrides of these acids, and it is preferred to use the acrylic acid or anhydric maleic acid.

The ratio of the modified monomer in the denatured olefin will be preferably made to 0.01–1 by weight % with respect to the polyolefin content (undenatured polyolefin+modified polyolefin).

Such denatured polyolefin is superior in the bonding to the metallic cover 11 and is thermally fusibly bonded to the plastic container body 14 (olefin resin).

Such a denatured polyolefin is coated on the inner surface of the peripheral edge 12 of the metallic cover 11 by fusing and spraying the same or by causing the same to adhere in form of dispersion in colloidal state under the existence of water or solvent. The coating amount is about 3–4 mg/cm$^2$, which is substantially the same as that for an ordinary metallic can.

1-2 Manufacturing Method

A method of manufacturing a container 10 with a metallic cover according to this embodiment will be briefly described hereafter with reference to the accompanying drawings.

Figure 1B:
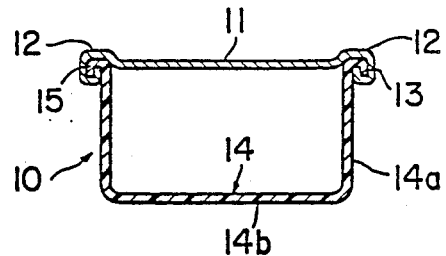

The denatured polyolefin, for example, as a heat sealing compound 13 is applied as a coating on the inner surface of the peripheral edge 12 of the metallic cover 11 (FIG. 1a). The peripheral edge 12 of the metallic cover 11 is roll-seamed around the flanged portion 15 of the container body 14 mainly made of the polypropylene by the double seaming method (FIG. 1b).

Figure 1C:
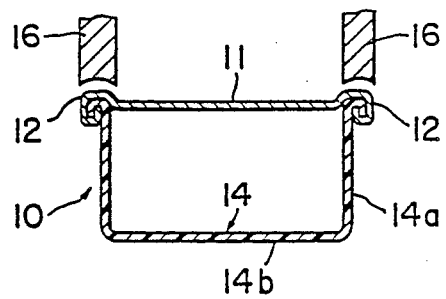
Figure 3:
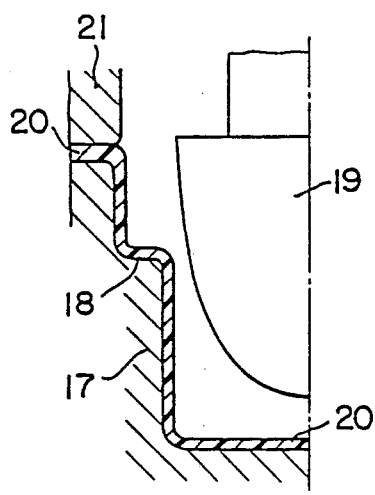

The roll-seamed peripheral edge 12 is then heated by a high frequency welder 16 to fuse the heat sealing compound 13 of the denatured polyolefin to thereby completely bond the peripheral edge 12 of the metallic cover 11 and the flanged portion 15 of the container body 14 mainly made of the polypropylene (FIG. 1c).

1-3 Specific Examples

(EXAMPLE 1-3-1)

The container 10 with the metallic cover according to this invention will be described via examples.

An aluminium metallic cover is used as the metallic cover 11, and an ionomer resin (manufactured by MITSUI PETROCHEMICAL INDUSTRIES, LTD., Commercial Product Name: Cemipearl S-110) as the heat sealing compound 13 is coated and an ethylene-acetic acid vinyl copolymer (manufactured by MITSUI PETROCHEMICAL INDUSTRIES, LTD., commercial product name: Cemipearl V-300) is further coated on the first mentioned coating. The coating amount is 4 mg/cm$^2$ and the cover size is for a 307 type can.

Figure 2:
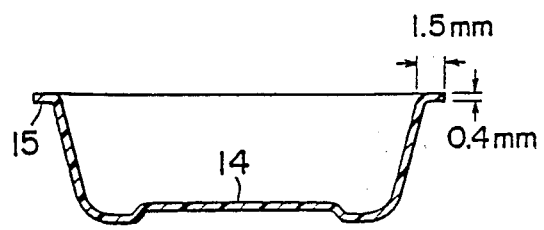

The container body 14 is formed, as shown in FIG. 2, by a thermal forming method of a lamination structure sheet having a thickness of 1.2 mm and consisting mainly of polypropylene/ethylene-vinyl alcoholic copolymer/polypropylene, and the above described metallic cover 11 is double seamed by means of a semi-automatic seamer, not shown. The container body 14 utilized in this example is obtained by the two-stage molding method shown in FIG. 3. That is, a step 18 is formed in a cavity structure 17 to form the flanged portion 15 of the container body 14. According to the two-stage molding method, a plug 19 presses a sheet 20 into the cavity 17; the sheet 20 is held by the cavity structure 17 and a core member 21; and thereafter, air pressure is supplied to cause the sheet 20 to adhere tightly to the surface of the cavity 17. The thus molded product is taken out and formed as the container body 14 having a flanged portion with a width suitable for subjecting to the double seaming of the metallic cover 11.

During these steps, the circumferential sheet 20 is drawn into the cavity 17 by thrusting the plug 19 into the cavity 17 before the stoppage of the cavity 17 and the core member 21 for holding the sheet 20, whereby the thicknesses of the bottom portion 14b and the connecting portion of the bottom portion 14b and the body portion 14a are increased, thus increasing the buckling strength of the container 14 for withstanding the double seaming. Even if the thickness of a sheet portion between the upper end surface of the cavity 17 and the core member 21 is increased, the thickness of a portion formed on the stepped portion 18 to constitute the flanged portion 15 is made thin, of a value of about 0.4 mm, thus obtaining the container body 14 suitable for being subjected to the double seaming operation.

The container body 14 being double seamed was completely fused and bonded by applying high frequencies (5 Kw; 10 KHz) to the flanged portion 15 by means of a high frequency induction heating device 16 (high frequency welder, manufactured by SEIDENSHA DENSHI KOGYO CO. LTD). The thus bonded container provided a completely sealed condition.

(Examples 1-3-1 to 17 and Comparison Examples)

Experiments were performed for confirming the completeness of the sealing effects of the seals by changing the heat sealing compounds 13 for coating the metallic cover 11. In addition to these experiments, experiments were also performed on containers with no coating as comparison examples. The results of these experiments are shown in the following table.

| | Heat Sealing Compounds | | | Sealed Condition | |
|---|---|---|---|---|---|
| Example | Resin Component | Solvent | Commercial Name | Good | Not Good |
| 1 | Ionomer Resin/EVA | Aquous[1] | Chemipearl S/Chemipearl V (MITSUI PETROCHEMICAL INDUSTRIES, LTD) | | |
| 2 | EAA | " | Zaikthene A (SEITETSU KAGAKU CO., LTD) | | |
| 3 | EAA | " | Zaikthene AC (SEITETSU KAGAKU CO., LTD) | | |
| 4 | EAA | " | Zaikthene L (SEITETSU KAGAKU CO., LTD) | | |
| 5 | EAA | " | Zaikthene N (SEITETSU KAGAKU CO., LTD) | | |
| 6 | Ionomer Resin | " | Chemipearl S (MITSUI PETROCHEMICAL INDUSTRIES, LTD) | | |
| 7 | Ionomer Resin/PE | " | Chemipearl S/Chemipearl V (MITSUI PETROCHEMICAL INDUSTRIES, LTD) | | |
| 8 | Denatured Polyolefin | Organic Solvent[2] | Morprime AD-78LJ8A (TOYO MORTON, LTD.) | | |
| 9 | " | " | Morprime AD-78LJ10 (TOYO MORTON, LTD.) | | |
| 10 | " | Resin[3] | Admer QE050 | | |

-continued

| Example | Heat Sealing Compounds | | | Sealed Condition | |
| --- | --- | --- | --- | --- | --- |
| | Resin Component | Solvent | Commercial Name | Good | Not Good |
| 11 | EVA | " | (MITSUI PETROCHEMICAL INDUSTRIES, LTD) Admer VE300 (MITSUI PETROCHEMICAL INDUSTRIES, LTD) | | |
| 12 | PE | " | Admer NE060 (MITSUI PETROCHEMICAL INDUSTRIES, LTD) | | |
| 13 | Denatured Polypropylene | " | Modic P-100F (MITSUIBISHI PETRO-CHEMICAL CO., LTD) | | |
| 14 | Denatured Polypropylene | Resin[3] | Modic P-300M (MITSUIBISHI PETRO-CHEMICAL CO., LTD.) | | |
| 15 | " | " | Novatec AP-270L (MITSUIBISHI CHEMICAL INDUSTRIES, LTD.) | | |
| 16 | " | " | Novatec AP-070L (MITSUIBISHI CHEMICAL INDUSTRIES, LTD.) | | |
| 17 | Denatured Polyolefin | " | Dumilan C-1570 (TAKEDA CHEMICAL INDUSTRIES, LTD.) | | |
| Comp. Example | No-coating | No-coating | | | X |

EAA: Ethylene-Acrylic Acid Copolymer
EVA: Ethylene-Vinyl Acetate Copolymer
PE: Polyethylene
[1]Aqueous: Resin Component In Emulsion State In Aqueous Solution
[2]Organic Solvent: Resin Component In Dispersed State In Organic Solvent
[3]Resin: Resin Component Heated and Fused

1-4 Effects

According to the first embodiment, the following effects are attained.

(1) The peripheral edge 12 of the metallic cover 11 is secured to the flanged portion 15 of the plastic container body 14 by the roll-seaming method.

(2) Since the heat sealing compound 13 existing between the peripheral edge 12 of the metallic cover 11 and the flanged portion 15 of the container body 14 is fused by high frequency heating and the metallic cover 11 and the container body 14 can be completely bonded by the fused compound 13, extremely good sealability can be achieved.

(3) No liquid or gas is permitted to pass through, and there is no possibility of releasing the metallic cover 11 under any external force applied.

(4) The container body 14 is made of a plastic material, so that it possesses transparency, and it is easily possible to confirm the content in the container body 14. In addition, improvement of the appearance of the package as a commercial product is afforded.

1-5 Another Example of Container with Metallic Cover having Heat Sealing Compound

(1-5-1 Another Example 1)

Figure 4:
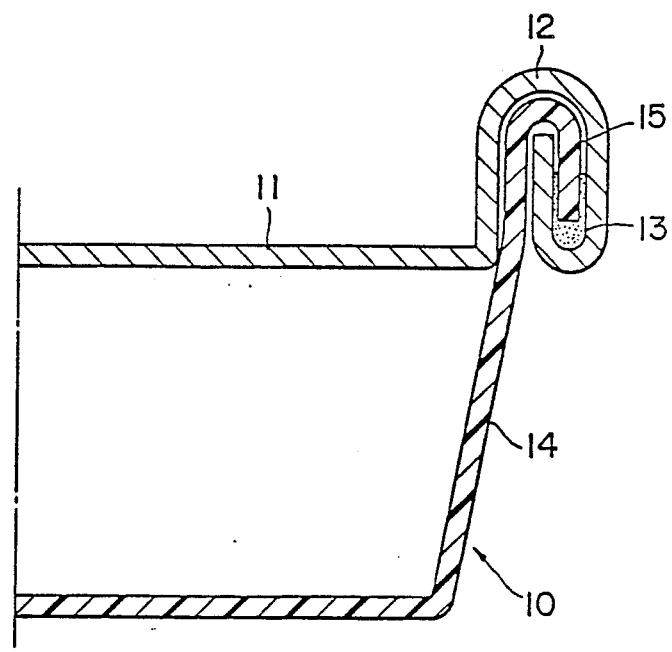
FIGS. 4 to 8 are views showing another container with a metallic cover of another example according to this invention.
Figure 5A:
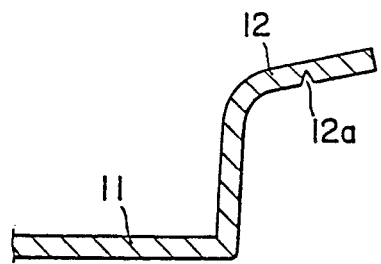
Figure 5B:
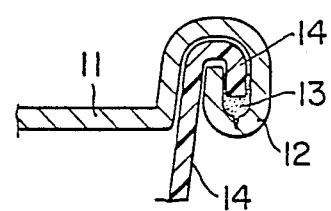

Another basic structure of the container with a metallic cover having a heat sealing compound is shown in FIGS. 4, 5a and 5b.

As shown in FIG. 4, the peripheral edge 12 of the metallic cover 11 on which the heat sealing compound 13 is coated and the flanged portion 15 of the container body 14 are multiply seamed. The multiple seam portion of the container with the metallic cover is shown in FIGS. 5a and 5b.

According to this invention, as shown in FIG. 5a, the seaming working can be easily performed as shown in FIG. 5b by preliminarily forming a notch 12a at a portion below the peripheral edge portion 12 of the metallic cover 11. In addition, the peripheral edge 12 is foldable at a portion of the notch 12a, so that the position to be folded always takes a constant position, thus performing a stable folding working.

(1-5-2 Another Example 2)

Figure 6:
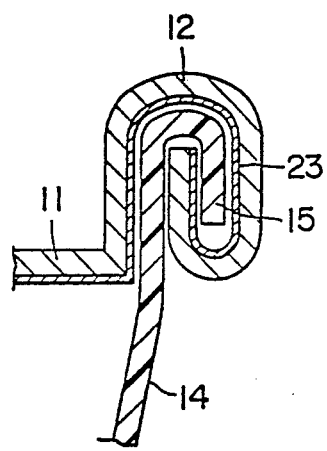
Figure 7:
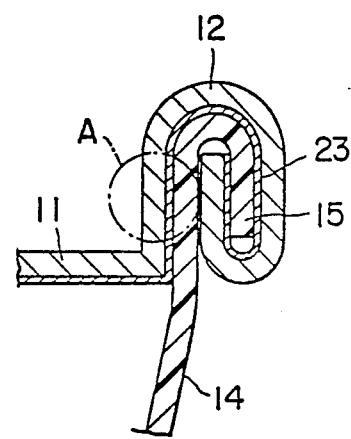
Figure 8:
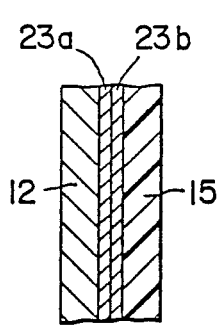

FIGS. 6 to 8 show a further basic structure of the container with the metallic cover.

As shown in FIG. 6, a laminated material (heat sealing compound) 13 prepared by an epoxy resin 23a and a denatured polyolefin 23b is preliminarily coated on substantially the entire inner surface of the metallic cover 11.

As shown in FIG. 7, after the peripheral edge 12 of the metallic cover 11 and the flanged portion 15 of the container body 14 have been multiply seamed, a gap between the peripheral edge 12 and the flanged portion 15 can be buried by effecting heat treatment to the roll-seamed portion. FIG. 8 is an enlarged view of a portion A shown in FIG. 7. As shown in FIG. 8, the gap between the peripheral portion 12 and the flanged portion 15 is buried by the laminated material 23 of the epoxy resin 23a and the denatured polyolefin 23b.

According to this example, the gap between the peripheral edge 12 and the flanged portion 15 can be buried in a wide range, thus further improving the sealing performance.

§2. Second Embodiment of Container with Metallic Cover (Container with a metallic cover provided with a sheet blank having a gas barrier property)

2-1 Basic Structure

The structure of the second embodiment of the container with the metallic cover according to this invention will be described with reference to FIGS. 9 to 12.

Figure 9:
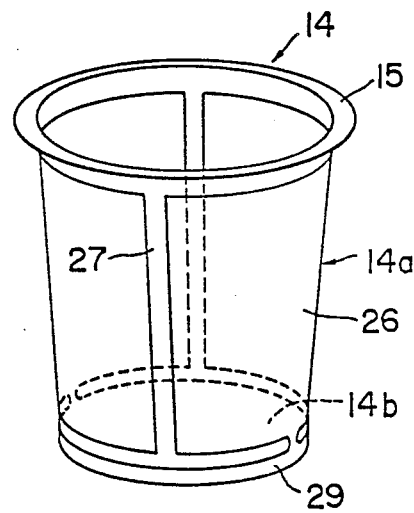
FIGS. 9 to 12 are views showing a container with a metallic cover provided with a gas barrier type sheet blank of a second embodiment of this invention.

FIG. 9 shows a container body 14 of the container with the metallic cover according to this invention. The container body 14 comprises a body portion 14a provided with a flanged portion 15 and pillar portions 27 and a bottom portion 14b provided with a bottom edge 29. The flanged portion 15, the pillar portions 27 and the bottom edge 29 are made of a thermoplastic material 28, and the body portion 14a and the bottom portion 14b are made of a sheet blank 26 and the thermoplastic resin 28. The sheet blank 26 utilizing the formation of the container body 14 according to this embodiment may include various modes each having the construction necessary that the resin for constituting the resin 28 for forming an injection molded product is the same as the resin for constituting the inner surface of the sheet blank 26. As the basic structure of the sheet blank 26 is used a laminated sheet of the thermoplastic resins constructed as follows:

| | |
|---|---|
| Polyethylene-terephthalate/Aluminum foil/Polypropylene (CPP) | (Dry Laminate) |
| Synthetic paper (PP)/Aluminum foil/Polypropylene (CPP) | (Dry Laminate) |
| Polyethylene-terephthalate/Vinylidene chloride copolymer/Polypropylene (CPP) | (Dry Laminate) |
| Polyethylene-terephthalate/Ethylene-vinyl alcohol copolymer/Polypropylene (CPP) | (Dry Laminate) |
| Polypropylene (OPP)/Polyethylene-extrusion coating paper/Aluminum foil/Polypropylene (CPP) | (Dry Laminate) |
| Polypropylene (OPP)/Polypropylene (CPP)/Polypropylene-Ethylene-vinyl alcohol copolymer-co-extrusion sheet of Polypropylene | (Dry Laminate & Heat Laminate) |

The thickness of the laminated sheet may be optionally selected in the range of $100\mu$ to $800\mu$. The sheet blank 26 to be used for this embodiment is punched out from the laminated sheet in a shape shown in FIG. 10 and is provided with a narrow foldable portion 26a along which the blank sheet 26 is bent when inserted into a mold, so that it is desired to preliminarily form the narrow foldable portion.

Figure 11:
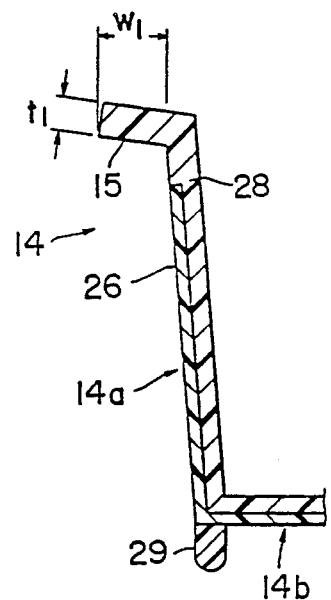
Figure 12:
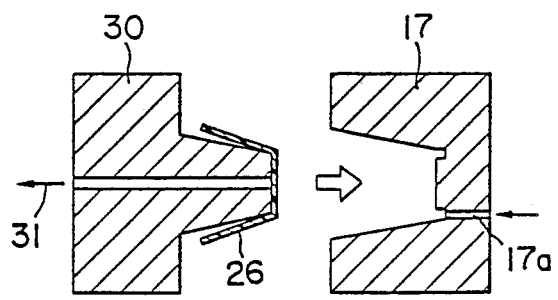

The injection molding method for forming the container body 14 according to this embodiment will be described hereafter. The sheet blank 26 is mounted to the core 30 by being sucked by vacuum means 31 as shown in FIG. 12, and the sheet blank 26 is then inserted as it is into the mold cavity 17. The resin is thereafter introduced through a gate 17a. It is important for this embodiment to form the neighbouring portion of the flanged portion 15 of the container body 14 with high formation accuracy for enabling the seaming operation, and with this embodiment, as shown in FIG. 11, it is necessary for the flanged portion to have a flange width $w_1$ of 1.0 to 2.5 mm and a flange thickness $t_1$ of 0.2 to 0.9 mm. Examples of the resin 28 used for the injection molding are polypropylene, polyethylene, polystyrene, polycarbonate, nylon, polyethylene-terephthalate, or like resin, but a thermoplastic resin of general type may be used. Since it is required for the resin 28 to be used for the injection molding to be fused and bonded to the resin material forming the inner surface of the sheet blank 26, in the case where the inner surface of the sheet blank 26 is formed by the polypropylene, it is desired to use the polypropylene for the resin 28, and on the other hand, when the polyethylene-terephthalate is selected for the resin 28, it is desired that the inner surface of the blank sheet 26 be formed by a polyethylene-terephthalate material.

2-2 Example (EXAMPLE 2-2-1)

The container with a metallic cover according to this embodiment will be described by way of preferred examples.

Figure 10:
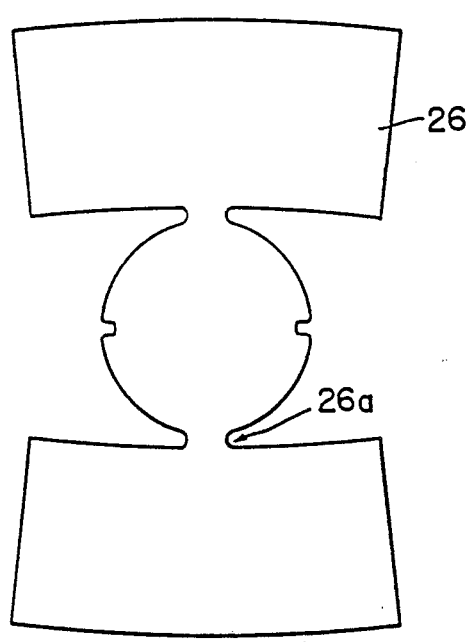

Sheet Blank 26:

As the sheet blank 26, a sheet of $400\mu$ was used comprising a co-extruding sheet of $20\mu$ polypropylene (OPP)/print/$60\mu$ polypropylene/$40\mu$ polypropylene-ethylene-vinyl alcohol copolymer/$320\mu$ polypropylene laminated by dry laminate and heat laminate means, and then punched out into a shape shown in FIG. 10. The mold such as that shown in FIG. 12 was used for carrying out the injection molding to obtain the sheet having the shape shown in FIG. 9. The width $w_1$ of the flanged portion was 1.8 mm and the thickness $t_1$ thereof was 0.5 mm.

Resin: Polypropylene (MFR 8.0)
Resin Temperature: 210°–240° C.
Mold temperature: 15° C.

The double seaming working for the thus molded product by 211 metallic cover had a good result.

(Example 2-2-2)

Sheet Blank 26:

As the sheet blank 26 was used a laminated sheet comprising $310\mu$ polypropylene synthetic paper (YUPO manufactured by OJI YUKA CO. LTD./$9\mu$ aluminium foil/$80\mu$ polypropylene (CPP)).

Thermoplastic Resin: Polypropylene Resin (MFR 8.0)

The injection molding was performed by substantially the same manner as that of the Example 2-2-1 and a container capable of being double seamed was obtained.

(Example 2-2-3)

Sheet Blank 26: Laminated sheet of $12\mu$ polyethylene-terephthalate/$9\mu$ aluminium foil/$380\mu$ polyethylene-terephthalate Thermoplastic Resin: Polyethylene-terephthalate The injection molding was performed in substantially the same manner as that of the Example 2-2-1 and a container capable of being roll-seamed was obtained.

(Example 2-2-4)

Sheet Blank 26:

As the sheet blank 26 a co-extruding sheet having thickness of $410\mu$ was used comprising $145\mu$ polypropylene/$40\mu$ bonded layer/$40\mu$ ethylene vinyl alcohol copolymer/$40\mu$ bonded layer/$145\mu$ polypropylene, and punched out in a shape shown in FIG. 10. Injection molding is carried out by using the mold such as shown in FIG. 12 to obtain the shape shown in FIG. 9, and the thus formed flanged portion had a width $w_1$ of 1.8 mm and thickness $t_1$ of 0.5 mm.

Resin: Polypropylene (MFR 8.0)
Resin Temperature: 210°–240° C.
Mold Temperature: 15° C.

The double seaming working for the thus molded product by 211 metallic cover had a good result.

(Gas Barrier Property 2-2-5)

The gas barrier properties of plastic containers (TSUNA No. 3 can; volume: 100 cc) formed in accordance with the above described examples (Examples 2-2-1 to 4) were measured, and the following results were obtained per containers each having volume of 100 cc.

| Containers | $O_2$ barrier | $H_2O$ barrier |
| --- | --- | --- |
| Example 1 | 0.2 | 0.05 |
| Example 2 | 0.2 | 0.01 |
| Exmaple 3 | 0.1 | 0.04 |

$O_2$ barrier: unit cc/100 cc; 24 hours; atm; 20° C., 90% RH (measured by Mocon Oxtran)

$H_2O$ barrier: unit g/100 cc; 24 hours; atm; 40° C., 90% RH

(Preserving Property 2-2-6)

The container bodies 14 obtained in accordance with the examples (Examples 2-2-1 to 4) were filled with meat sauce, sealed by double seaming method, sterilized in a retort, and kept as they are for 6 months in a usual room temperature. The results exhibited good preserving properties.

2-3 Effects

The following effects can be attained by the above described embodiment.

(1) Since the flanged portion 15 of the plastic container body 14 is molded by the injection molding method, the flanged portion 15 can be precisely molded with the predetermined dimensions of the width and the thickness, thus being capable of withstanding the double seaming of the metallic cover 11.

(2) The body portion 14a and the bottom portion 14b of the container body 14 can be molded by the insert injection molding method by using the laminated sheet blank 26 having an improved gas barrier property. Accordingly, the container body 14 possesses the $O_2$ gas barrier property of less than 0.8 cc/100 cc, 24 hours, atm (20° C., 90% RH) and the $H_2O$ gas barrier property of less than 0.2 g/100 cc, 24 hours, atm (40° C., 90% RH), thus having an extremely improved preservation property.

§3. Third Embodiment of Container with Metallic Cover (Container with a metallic cover molded with a sheet blank including a polyethylene-terephthalate layer having a crystallization degree of 10 to 40%)

3-1 Basic Structure

The structure of the third embodiment of the container with a metallic cover according to this invention will be described with reference to FIGS. 13 and 14.

Figure 13:
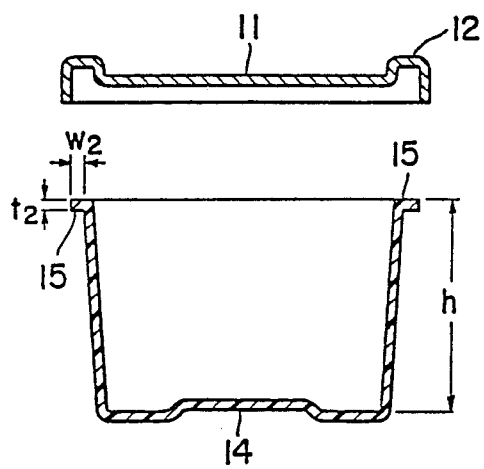
FIGS. 13 and 14 are views showing a container with a metallic cover provided with a sheet blank including a polyethylene-terephthalate layer having a crystallization degree of 10 to 40% of a third embodiment of this invention.
Figure 14:
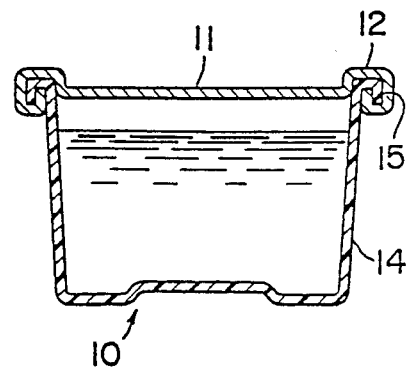

Referring to FIGS. 13 and 14, the container 10 with the metallic cover comprises a plastic container body 14 provided with a flanged portion 15 and a metallic cover 11 provided with a peripheral edge 12 for roll-seaming the flanged portion 15. The container body 14 is made by using a sheet blank including a polyethylene-terephthalate crystallized by heat treatment, i.e., a polyethylene-terephthalate layer including a crystallization promoting nucleus, and manufactured by heat formation so that the degree of crystallization of the polyethylene-terephthalate becomes 10 to 40%.

The polyethylene-terephthalate to be used for this embodiment is a crystalline polyethylene-terephthalate (called C-PET hereinafter) made by adding the crystallization promoting nucleus to the polyethylene-terephthalate so as to rapidly promote the crystallization in the heating time. As the nucleus, is added a polyolefin resin, such as polyethylene resin or polypropylene resin, by small amounts of about 0.5 to 2.0%. According to this invention, the strength of the container as the mold product is improved and has a heat-proof property in the double seaming process because of the location of the C-PET layer.

In order to improve the water vapor barrier property as well as the gas barrier property of the polyethylene-terephthalate, it is desired to use a co-extruding sheet of the olefin resin such as polypropylene resin or, in order to further improve the gas barrier property, to use a sheet including an ethylene-vinyl alcohol copolymer layer. The thicknesses of these sheet blanks are each preferably in the range of 0.8 to 1.4 mm.

The sheet blank including C-PET of this embodiment will be listed, for example, as follows.

(I) Single layer of C-PET or C-PET/PET (II) C-PET/bonded layer/co-extrudin9 sheet of polypropylene (III) C-PET/bonded layer/ethylene-vinyl-alcohol copolymer/bonded layer/co-extruding sheet of polypropylene (IV) C-PET/bonded layer/co-extruding sheet of polypropylene and polypropylene/bonded layer/ethylene-vinyl alcohol copolymer/bonded layer/heat laminate sheet with co-extruding sheet of polypropylene Among the above, it is desired to use the sheet III or IV for improving the gas barrier property.

3-2 Manufacturing Method

A container, by using a sheet blank of the character described above, having the flanged portion 15 capable of being roll-seamed with the metallic cover 11 is formed by a heat molding method, which is preferably a two-stage molding method by using a heated mold. The above described C-PET is crystallized by being heated with, for example, 170° C. for 3 to 8 seconds at the crystallization degree of 10 to 40%.

In one example, the heating mold includes a mold heated to 180° C. and a mold cooled to 10° C., and the sheet blank heated to 130° C. is molded in the heating mold, then crystallized, and thereafter cooled in the cooling mold having a temperature of 10° C., thus solidifying the container body 14. In order to effect the double seaming working of the metallic cover, the container body 14 is molded so as to provide the flanged portion having thickness of 0.2 to 1.0 mm, and after the solidification, is punched out so as to provide the flanged portion having width of 1.0 to 2.5 mm. The thus manufactured container is filled with a content and then sealed by double seaming the metallic cover.

3-3 Examples (Example 3-3-1)

C/PET (500μ)/PET (500μ) including a C-PET layer containing polypropylene of 1 by weight % was utilized as the sheet blank. A heating mold heated to 180° C. and a cooling mold cooled to 10° C. were used, and the sheet was heated to 130° C. and pressed into the heating mold in which the sheet was heated for about 5 seconds to be crystallized. The sheet blank was thereafter solidified in the cooling mold. The degree of crystallization of the polyethylene-terephthalate in the sheet blank is 30 to 40%. After the solidification, the sheet blank is punched out so as to provide the flanged portion having the width $w_2$ of 1.8 mm. The thus formed container body 14 has substantially the shape shown in FIG. 13 and has the depth h of about 30 mm and the flange thickness $t_2$ of 0.5 mm. The container body 14 was sealed by double seaming the flanged portion 15 with the metallic cover 11.

(Examples 3-3-2 and 3-3-3)

Except for the following change of the sheet blank, the plastic container body 14 was obtained by substantially the same manner as that described with respect to the Example 3-3-1, and the same type C-PET as that used in the Example 3-3-1 was used. Sheet Specification

| | |
|---|---|
| [C-PET/bonded layer/PP] = [500 μ/40 μ/480 μ] | Example 3-3-2 |
| [C-PET/bonded layer/PP/heat laminate/PP/bonded layer /EVOH/bonded layer/PP] = [500 μ/40 μ/100 μ/120 μ/40 μ/ 40 μ/40 μ/120 μ] | Example 3-3-3 |

The obtained container body 14 was sealed by double seaming working with the metallic cover 11.

(3-3-4 Gas Barrier Property, Heat-Proof Property, Preservation Property)

The gas barrier property, heat-proof property and preservation property of the containers obtained by the Examples 3-3-1 to 3 will be described hereafter.

Heat-proof property: The container was filled with meat sauce of 60° C. and sterilized in a retort for 30 minutes. The heat-proof property was thus examined against the heating and cooling.

Preservation property: the meat sauce thus filled in the container was maintained as it is for six months and examined as to whether or not it could be kept against a function test as a good product.

Gas barrier property: $O_2$ gas barrier, unit cc/100 cc, 24 hours, atm (20° C., 90% RH).

| Examples | Gas Barrier ($O_2$) | Heat-proof Property | Preservation Property |
|---|---|---|---|
| 1 | 0.15 | | |
| 2 | 0.25 | | |
| 3 | 0.05 | | |

3-4 Effects

The following effects were obtained according to the third embodiment.

(1) Since a polyethylene-terephthalate having superior physical and mechanical natures in a wide temperature range is used as a sheet blank for forming a container body and the sheet is molded so that the degree of crystallization of the polyethylene-terephthalate as a molded product is 10 to 40%, the container body 14 according to this embodiment is endowed with the backing strength and the heat-proof property sufficient for withstanding the force applied to the container body when roll-seamed.

(2) In addition, in a case where the sheet blank forming the container body 14 constructed as a composite sheet made of a synthetic resin in addition to the polyethylene-terephthalate for further improving the gas barrier property, the preservation property of the container body 14 can be further improved.

§4. Fourth Embodiment of Container with Metallic Cover (Container with a metallic cover made by a laminated sheet of polyethylene-terephthalate and polyallylate)

4-1 Basic Structure

The fourth embodiment of a container with a metallic cover according to this invention will be described with reference to FIGS. 15 to 20.

The container body of the container body with a metallic cover was manufactured by thermally molding a laminated sheet of polyethylene-terephthalate and polyallylate.

The polyallylate referred to in this embodiment indicates an aromatic polyester comprising terephthalic acid, isophthalic acid and bisphenol A. The polyethylene-terephthalate and polyallylate are integrally formed by the co-extruding technique as a film forming working even in the absence of a bonded layer. A moldability similar to that of the polyethylene-terephthalate can be imparted to the laminated sheet by blending the polyethylene-terephthalate and polyallylate.

The laminated sheet of the construction described above is thermally molded to form a plastic container superior in the heat-proof property as well as the transparency. It is desired for the shape of the plastic container to have a flanged portion which can be double seamed and the thus molded container is used as a can for preserving foods or the like therein.

4-2 Examples

Although examples are referred to hereafter, this invention is not limited to these examples.

Figure 18:
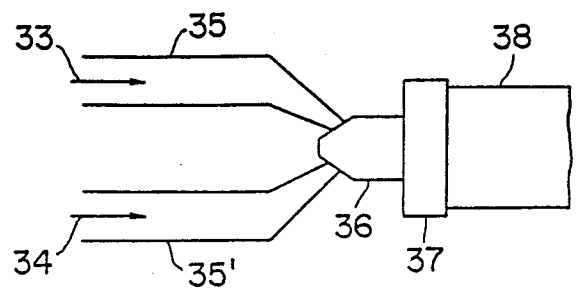

As a polyallylate described above and used for this embodiment, may be used U-polymer (U-8000) (commercial sale name) manufactured and sold by YUNI-CHIKA CO. LTD. A laminated sheet 38 was obtained by using this U-polymer and commercially sold polyethylene-terephthalate manufactured by MITSUI PETTO CO. LTD., J-125) and extruding, as shown in FIG. 18, the polyethylene-terephthalate 33 and polyallylate 34 from cylinders 35 and 35' and a die 37 through a feed block 36. The temperature of the die was 290° C. and the temperature of the cylinders were set as follows.

| Cylinder Temperature | U-Polymer | Polyethylene-terephthalate |
|---|---|---|
| $C_1$ | 240° C. | 220° C. |
| $C_2$ | 260° C. | 230° C. |
| $C_3$ | 280° C. | 230° C. |

Figure 15:
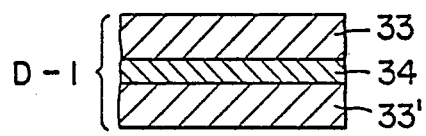
FIGS. 15 to 20 are views showing a container with a metallic cover made of laminated sheets of a polyethylene-terephthalate and a polyallylate of a fourth embodiment of this invention.
Figure 16:
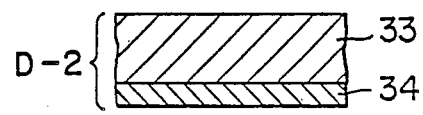
Figure 17:
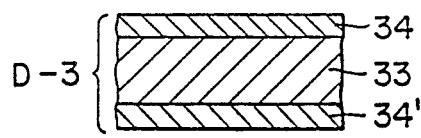

The layer composition of the laminated sheet 38 can be optionally set. FIG. 15 shows a laminated sheet D-1 in which a polyallylate layer 34 is interposed between the polyethylene-terephthalate layers 33 and 33'; FIG. 16 shows a laminated sheet D-2 prepared by laminating the polyethylene-terephthalate layer 33 and the polyallylate 34; and FIG. 17 shows a laminated sheet D-3 in which the polyethylene-terephthalate layer 33 is interposed between the polyallylate layers 34 and 34'. The thermal molding methods were carried out by using the respective laminated sheets. The molding methods are generally performed by an air or vacuum pressure formation technique, but the above described sheets were subjected to the previous heat molding process. The laminated sheet D-1 is preheated from the upper and lower sides of the polyethylene-terephthalate layers 33 and 33' constituting the upper and lower surfaces of the laminated sheet so that the temperature of the sheet becomes 120° to 140° C., and in that time, the temperature of the polyallylate layer 34 becomes 100° to 120° C. The laminated sheet D-2 is prepared by heating the polyethylene-terephthalate layer 33 to the temperature of 100° to 120° C. and the polyallylate layer 34 to the temperature of 120° to 140° C. The laminated layer D-3 was preheated by heating the polyallylate layers 34 and 34' to a temperature of 120° to 140° C. from the upper and lower sides of the layer. The preheated laminated layers were thermally formed by the following method, but the most suitable heating temperature of the polyethylene-terephthalate layer was different from that of the polyallylate layer by about 20° C., the latter being higher than the former by about 20° C. Regarding the laminated sheets D-1, D-2 and D-3, D-2 and D-3 were easily formed in comparison with D-1.

Although the thermal formation can be done by any known method, a method for carrying out the thermal formation due to a plug-assist method by using a mold prepared by the applicant of this invention will be described hereunder.

Figure 19A:
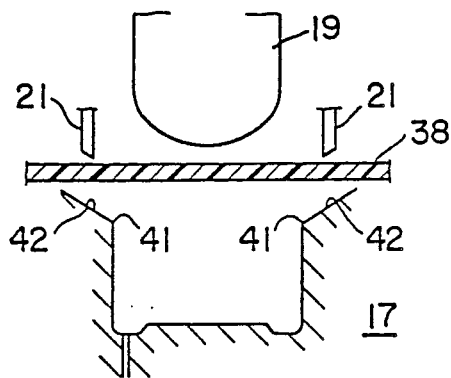

The plastic container provided with a flanged portion which can be double seamed can be manufactured by using such a mold. Namely, a mold shown in FIG. 19a, 10b or 19c, is provided with an upper edge 42 of a cavity extending upwardly from the outer peripheral upper end portion 41 of the cavity at an inclination angle of $5° < \theta < 40°$, and a clamp 21 abutting against the upper edge 42 of the cavity in advance of the lowering of a plug 19 and clamping the plastic sheet 38 is located so that the distance l between the upper end portion 41 of the outer periphery of the cavity and the inner peripheral surface of the clamp 21 is in a range of $5 mm < l < 20$ mm. The thermal formation processes due to the plug-assist method by using the mold of the type described above are described.

(1) The cavity 17 provided with the upper edge 42 upwardly extending from the upper end portion 41 of the outer periphery of the cavity is upwardly moved with respect to the heated sheet 38 and the plug 19 is then lowered (FIG. 19a).

Figure 19B:
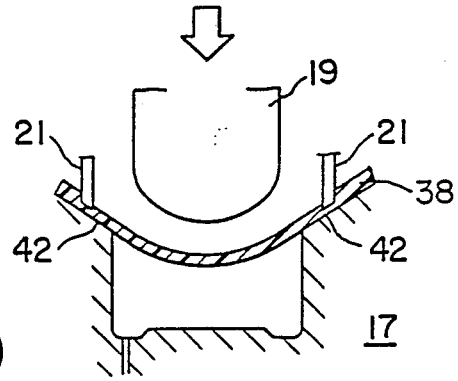
Figure 19C:
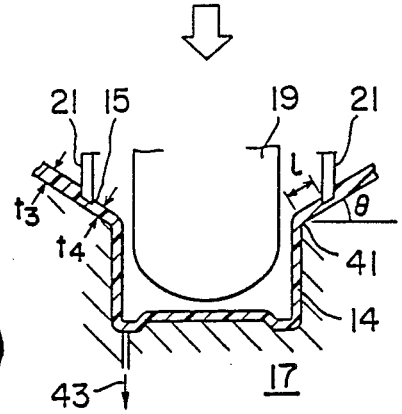

(2) The clamp 21 is lowered to clamp the sheet 38 between the clamp 21 and the upper edge 42 of the cavity, and the plug 19 is lowered into the cavity 17 (FIG. 19b).

(3) The plug 19 forcibly lowers the sheet 38 into the cavity 17 and the sheet 38 is sucked into the cavity 17 by vacuum means 43. At this time, the thickness of a sheet portion for forming the flanged portion $t_4$ is made thin in comparison with the thickness $t_3$ of the sheet 38 in original shape (FIG. 19c).

The sheet 38 is then punched out so that the portion 15 of the thus formed container body 14 has a predetermined width, thus obtaining the plastic container body having a flanged portion capable of being double seamed.

Figure 20:
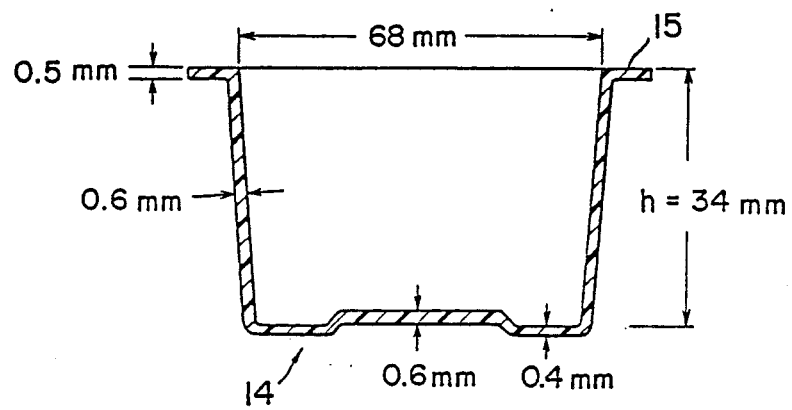

Hot-water filling tests were made by using the plastic container body 14 shown in FIG. 20 thermally formed as described above by using the laminated sheet D-2 to measure shrinkage ratios at a portion of the container body 14 having the depth h.

Provided that the depth h of the container body 14 is made to $h^0$ after the shrinkage, the shrinkage ratio is expressed as:

Shrinkage Ratio = $(h - h_0)/h \times 100$ (%)

and the results of the tests are shown in the following table.

| PET/U-Polymer Ratio | Temperature of Filled Hot Water (°C.) | | | |
|---|---|---|---|---|
| | 60 | 70 | 80 | 90 |
| 20/0 (Reference Examples) | 2 | 5 | 12 | 15 |
| 20/1 | 0.6 | 4 | 10 | 15 |
| 18/1 | 0.5 | 4 | 10 | 15 |
| 15/1 | 0.2 | 2 | 5 | 10 |
| 10/1 | 0.1 | 0.8 | 1.0 | 1.5 |
| 8/1 | 0.1 | 0.4 | 0.5 | 0.8 |
| 5/1 | 0 | 0.3 | 0.4 | 0.6 |
| 2/1 | 0 | 0.2 | 0.4 | 0.5 |

According to the results of the tests, it was found that there was no practical problem in case of the shrinkage ratio being less than 1.5%, and in consideration of the formability, it is preferred that the ratio of the polyethylene-terephthalate (PET) to the polyallylate (U-polymer) is in the range of 15:1 to 5:1.

The container body 14 shown in FIG. 20 was prepared by the laminated sheet having the layer ratio 8:1 and orange jelly was filled at a temperature of 80° C., and a container with a metallic cover was manufactured by double seaming a metallic cover, not shown, to the flanged portion 15 of the thus prepared container body 14. The container with the metallic cover could withstand the filling heat temperature 80° C. and provided the good roll-seaming property.

4-3 Effects

According to the fourth embodiments, the following effects can be attained.

(1) Since the container body 14 is formed by thermally molding the laminated sheet 38 including the polyethylene-terephthalate 33 and the polyallylate 34, the container body is thermally shrunk to a lesser extent in the filling time in comparison with a container body made of a single material sheet and is superior in transparency and strength.

(2) Since the container body 14 is formed by the thermal molding method, it is suitable for mass production, and the flanged portion 15 of the container body 14 can be formed so as to have a thickness capable of being double seamed by selecting a suitable thermal molding method. Accordingly, the metallic cover can be roll-seamed with an excellent sealability to thereby effectively preserve the foods or the like.

§5. Fifth Example of Container with Metallic Cover
(Container with a metallic cover made of a laminated sheet and provided with an injection-molded flange portion)

5-1 Basic Structure

Figure 22:
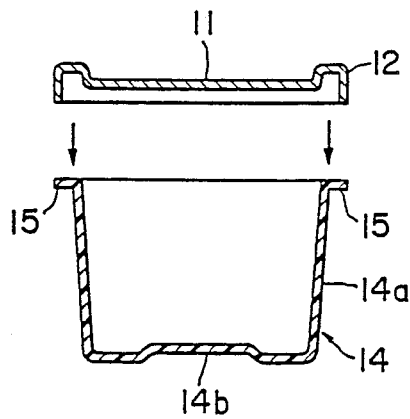
Figure 22:
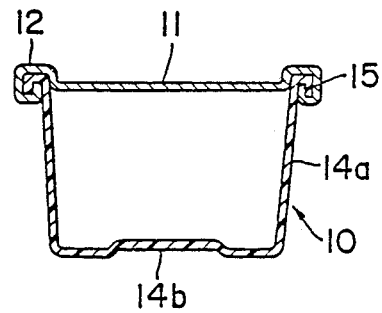
Figure 23:
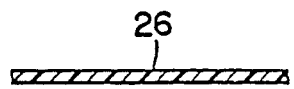
Figure 23:
Figure 23:
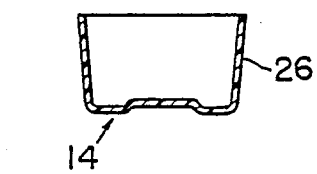
Figure 23:
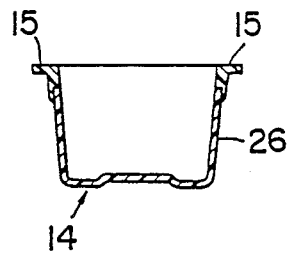

The fifth embodiment of a container with a metallic cover according to this invention will be described with reference to FIGS. 21 to 23.

Figure 21:
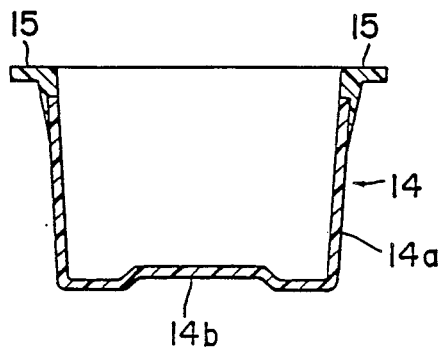
FIGS. 21 to 23 are views showing a container with a metallic cover having a flanged portion made of laminated sheets formed by an injection forming method of a fifth embodiment of this invention.

The container 10 with a metallic cover comprises a container body 14 having, as shown in FIG. 21, a bottom portion 14b, a body portion 14a formed integrally therewith, and a flanged portion 15 fuse-bonded to the upper peripheral edge of the body portion 14a and comprises a metallic cover 11 having a peripheral edge which is to be roll-seamed to the flanged portion 15 as shown in FIGS. 22a and 22b to seal the container 10.

Processes for forming the container body according to this embodiment will be described with reference to FIGS. 23a to 23d.

The bottom portion 14b and the body portion 14a of the container body 14 are first thermally formed in shapes shown in FIG. 23b by solely or in combination utilizing a known vacuum formation, pressure formation or plug-assist formation or a thermoplastic resin sheet 26 shown in FIG. 23a, and then these portions are cut as shown in FIG. 23c. Although the thermoplastic resin sheet 26 may be prepared by a polypropylene resin, a polycarbonate resin, a polystyrene resin, a polyethylene-terephthalate resin or a polyvinylchloride resin, it is possible to use a laminated sheet prepared by the co-extruded resin superior in the gas barrier property or a known dry lamination method in a case where it is required for the container body to have the gas barrier property. Particularly, in case of forming a container body 14 for the food preservation, for example, a nylon resin, a vinylidene chloride copolymer, a polyvinylalcohol, or an ethylene-vinyl alcohol copolymer, each having an oxygen transmission coefficient of less than $5 \times 10^{-9}$, is used. The aforementioned resin superior in the rigidity and strength is used as a base resin, and in a case where the base resin is bonded to the resin having the gas barrier property with weak bonding force, these resins may be bonded by interposing a resin having an adhesive property such as acid denature olefin or bonded by a polyurethane type bonding agent.

In the next step, the body portion 14a and the bottom portion 14b cut as shown in FIG. 23c are inserted into an injection mold and only the flanged portion 15 is thereafter molded by the injection molding machine. The flanged portion 15 in the injection molding method is formed with the same resin as that of the body portion 14a and the bottom portion 14b or an adhesive resin. The flanged portion 15 is formed at substantially the same time of the injection, and the body portion 14a and the bottom portion 14b are fused and bonded to thereby obtain an integrated container body 14. The thus formed container body 14 comprises the body portion 14a and the bottom portion 14b provided as occasion demands with the gas barrier property and the flanged portion 15 having the stability in dimensions. Sufficient sealing effect of the container can be attained by roll-seaming the peripheral edge of the metallic cover 11 around the flanged portion 15, thus preventing the occurrence of fault product.

5-2 Examples (Example 5-2-1)

The container with a metallic cover according to this embodiment will be described by way of examples.

A co-extrusive five layered sheet having a total thickness of 1.5 mm and essentially consisting of polypropylene/"Adomer" (registered trade mark, manufactured by MITSUI PETROCHEMICAL INDUSTRIES, LTD)/ethylene-vinyl alcohol copolymer/"Adomer"/polypropylene was prepared by a feedblock type T-die film forming machine. A body portion 14a having an inner diameter of 67.0 mm and a depth of 30 mm and a bottom portion 14b were formed as shown in FIGS. 23a to 23c by using a cosmic type vacuum forming machine (manufactured by ASANO KENKYU SHO). The thus formed body portion 14a and the bottom portion 14b were inserted into an injection molding machine (die clamping force: 120 t) manufactured by NISSEI JUSHI KOGYO KABUSHIKI KAISHA, and a flanged portion 15 was formed by injection molding polypropylene. According to these steps a container body 14 shown in FIG. 21 could be obtained. The thus formed container body 14 was filled with water and roll-seamed by a metallic cover 11 for an aluminium can by using a semitron seamer. The container was sterilized in retort for 30 min. at 120° C., resulting in good roll-seamed the container.

(Example 5-2-2)

A three-layered sheet having a total thickness of 1.0 mm and essentially consisting of polyethylene-terephthalate/"U-polymer" (registered trade mark, YUNICHIKA KABUSHIKI KAISHA No. 8000 Grade)/polyethyleneterephthalate was prepared by a multihold type T-die film forming machine. The flanged portion 15 was formed by the injection molding method by using the polyethylene-terephthalate as described with reference to the former example 5-2-1, thus obtaining the container body 14 shown in FIG. 21. The metallic cover 11 was double seamed as described with reference to the former example 5-2-1, and thereafter, the container body was boil-sterilized for 20 min. at 80° C., resulting in good roll-seamed condition, no leakage of content and no deformation of the container.

5-3 Effects

The following effects can be attained by this fifth example.

(1) Since the body portion 14a and the bottom portion 14b of the container body 14 are formed by the thermal forming method and a laminated sheet having desired characteristics in accordance with a content to be filled in the container body can be optionally selected, the container body 14 can be formed by the thus selected laminated sheet to be endowed with desired gas barrier property and odor keeping property for the container body 14.

(2) Since the flanged portion 15 of the container body is formed by the injection molding method with the high molding accuracy, it is possible to form the flanged portion so as to have a shape or dimensions suitable for the roll-seaming of the peripheral edge 12 of the metallic cover 11 with substantially no fault.

(3) Since the flanged portion 15 is fused and integrally bonded to the container body 14 at the injection molding time, the manufacturing process thereof is made simplified.

§6 Sixth Embodiment of Container with Metallic Cover
(Container with a metallic cover having a bottom portion projecting outwardly)

6-1 Basic Structure

The structure of the sixth embodiment of a container with a metallic cover according to this invention will be described with reference to FIGS. 24 to 29.

Figure 24:
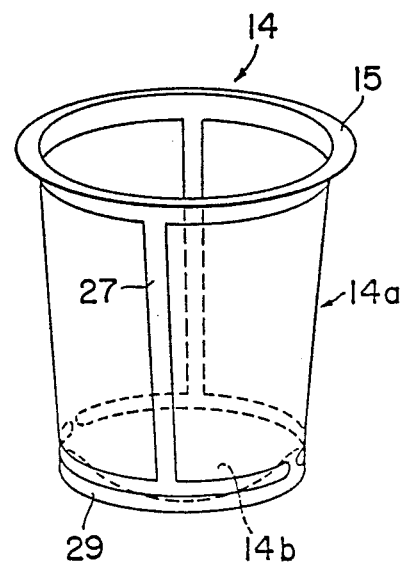
FIGS. 24 to 29 are views showing a container with a metallic cover having a bottomed portion formed in outwardly protruded shape of a sixth embodiment of this invention.

The container body 14 of a container with a metallic cover according to this embodiment shown in FIG. 24 comprises a body portion 14a and a bottom portion 14b both molded by an injection molding method from a sheet blank, a flanged portion 15 made of a thermoplastic resin, pillars 27 and a bottom edge portion 29.

As a sheet blank is used a laminated sheet with the gas barrier property having a construction including a resin of the same material as that used for forming an injection molding product or thermoplastic resin coat fusible by heat, and the laminated sheet is inserted into the mold.

Figure 25:
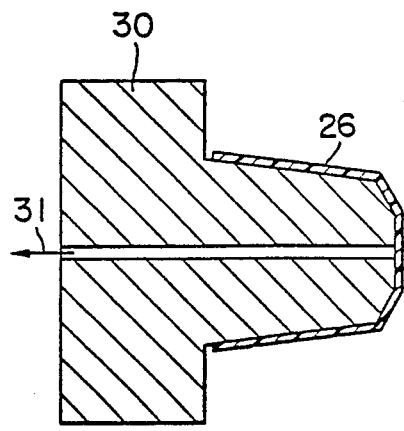
Figure 26:
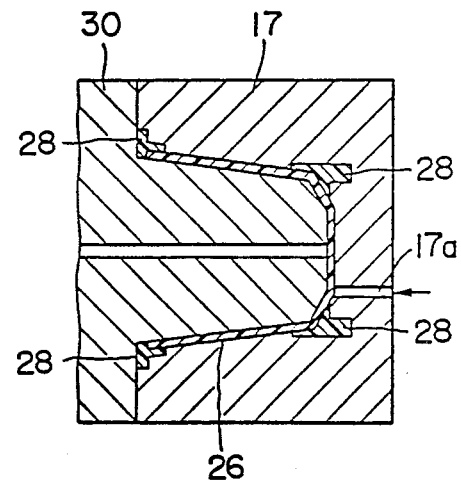
Figure 27:
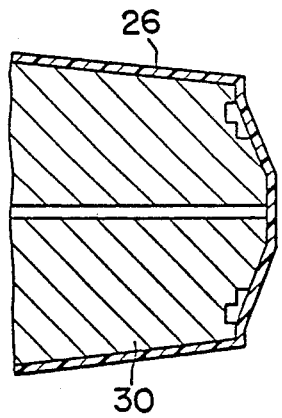
Figure 28:
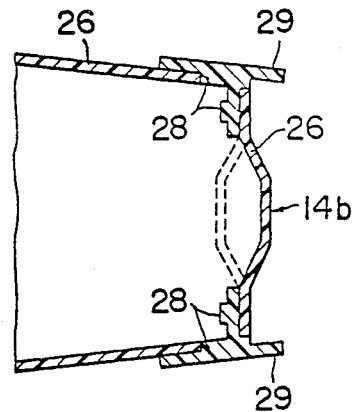
Figure 29:
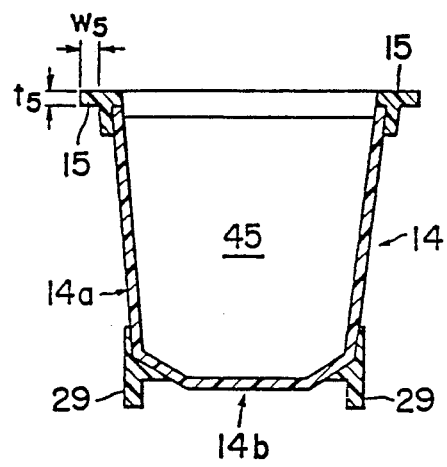
Figure 29:
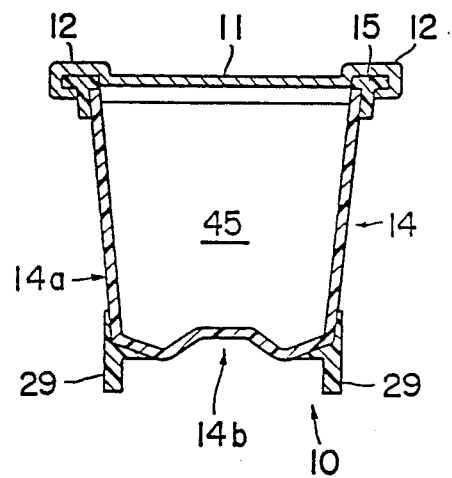

For the formation of the container body 14, it is impossible to place the sheet blank 26 in the core 30 of the mold having a projected front end to form the bottom portion 14b of the container body into a protruded shape. The sheet blank 26 sucked by vacuum means 31 to mount on the core 30 is inserted as it is into the cavity 17 of the mold. The resin 28 is then fed through the gate 17a. FIGS. 25 and 26 show one example of the injection molding. FIG. 27 shows a cross section of the second example of the core 30 for mounting the blank for the injection molding, and FIG. 28 shows a cross section of the bottom portion 14b injection-molded by using the core 30 shown in FIG. 27.

As shown in FIGS. 29a and 29b, it is preferred that the flanged portion 15 of the container body 14 has a width $w_5$ of 1.0 to 2.5 mm and a thickness $t_5$ of 0.25 to 0.9 mm for enabling the double seaming working to the flanged portion 15. As a resin to be used for the injection molding operation are listed polypropylene, polyethylene, polystyrene, polycarbonate, nylon, The plastic container body 14 formed so as to include the sheet blank having the gas barrier property and provided with the thus formed flanged portion 15 capable of being double seamed has the bottom portion 14b which is formed by the sheet blank 26 to provide a protruded shape, and the protruded bottom portion 14b is induced into the interior of the container body by the reduced pressure at the roll-seaming time to project inwardly of the container body.

Namely, as shown in FIG. 29a, the bottom portion 14b of the container body 14 filled with the content 45 is deformed from a shape shown in FIG. 29a to a shape shown in FIG. 29b when the flanged portion 15 is roll-seamed under the reduced pressure of 40 cmHg and the pressure is thereafter returned to an atmospheric pressure. Such deformation of the bottom portion can prevent the deformation of the entire shape of the container body 14.

6-2 Examples (Example 6-2-1)

A container with a metallic cover according to this embodiment will be described by way of an example.

As a sheet blank was used a laminated sheet, having a thickness of 0.4 mm, which comprises polypropylene (OPP)/polypropylene/bonded layer/ethylene-vinyl alcohol copolymer/bonded layer/polypropylene, and an injection molding process was carried out by injecting the polypropylene into a mold such as shown in FIG. 25 or 26. A container body 14 thus formed had a flanged portion 15 having a thickness of 0.5 mm and a width of 1.8 mm and a bottom portion 14b formed in a shape projecting outwardly of the container body 14. Water was filled in the container with a head space of 4 mm height and a metallic cover 11 was roll-seamed under the vacuum condition of 40 cmHg.

The container body 14 after the roll-seaming step was not substantially deformed except the bottom portion 14b slightly recessed and the entire shape of the container body 14 could be maintained. Even in the sterilization of the container body in the retort for 30 min. at 120° C., substantially no deformation of the container body 14 was observed.

6-3 Effects

According to the sixth embodiment, the following effects are attained.

Since the sheet blank 26 constituting the bottom portion 14b of the container body 14 is formed in a shape projecting outwardly of the container body 14, the projected bottom portion 14b is sucked into the interior of the container body by a reduced pressure therein to be formed in a shape recessed inwardly of the container body 14 at a time when the flanged portion 15 is roll seamed under the vacuum condition by the peripheral edge 12 of the metallic cover 11, the other constructional portions of the container body 14 can be prevented from being deformed.

§7 Seventh Embodiment of Container with Metallic cover (Body of a container with a metallic cover is provided with a rib)

7-1 Basic Structure

The structure of the seventh embodiment of a container with a metallic cover according to this invention will be described with reference to FIGS. 30 to 38.

Figure 30:
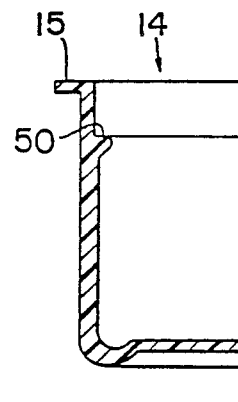
FIGS. 30 to 38 are views showing a container with a metallic cover having a container body provided with ribs of a seventh embodiment of this invention.

The container body of the container with a metallic cover according to this embodiment is shown in FIG. 30. The container body 14 is provided with a rib 50 disposed below the flanged portion 15 at an inner surface of the container so as to project inwardly thereof. A thermal molding method of the container body 14 with the rib 50 is described with reference to FIGS. 31 to 34.

Figure 31:
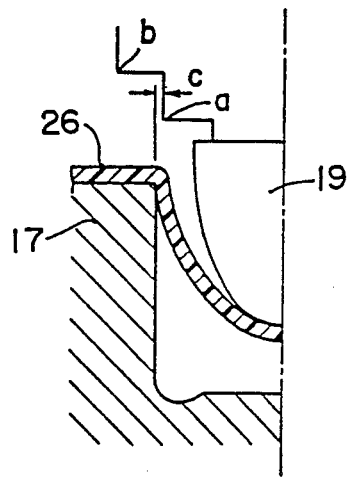

(1) A thermoplastic resin sheet 26 is forcibly invaded into the interior of the cavity 17 by means of a plug 19 (FIG. 31). A compressed air is blown when the (1) A thermoplastic resin sheet 26 is forcibly invaded into the interior of the cavity 17 by means of a plug 19 (FIG. 31). A compressed air is blown when the resin sheet 26 is pressed thereinto to a certain extent. At this step, vacuum means may be utilized instead of the compressed air, and the combination of the compressed air and vacuum means may be also utilized.

Figure 32:
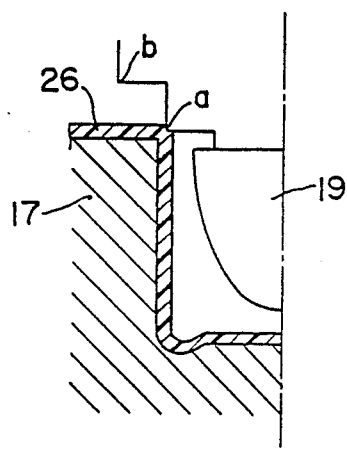

(2) The sheet 26 is forcibly pressed against the inner wall surface of the cavity 17 by the application of the compressed air and the vacuum means, and the timing of this process is determined at the timing at which the molding process can be precisely performed (FIG. 32).

(3) The plug 19 is dropped and at the same time, stepped portions a and b provided for the upper portion of the plug 19 advance in the cavity 17 so as to be in contact with the sheet under pressure.

The stepped portion a is so formed that a clearance C, mentioned hereinafter, is created between the cavity 17 and the stepped portion a of the plug 19.

Figure 33:
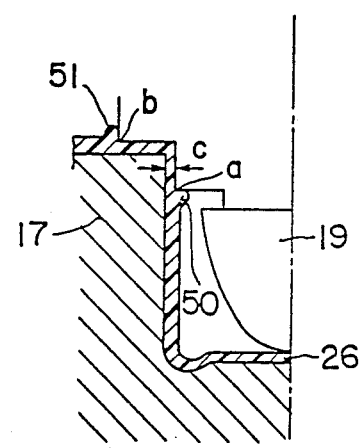

The sheet 26 is pressed by the stepped portion a, thus forming the rib 50. A rib 51 is also formed by pressing the sheet 26 by the stepped portion b provided for the cavity 17 (FIG. 33).

Figure 34:
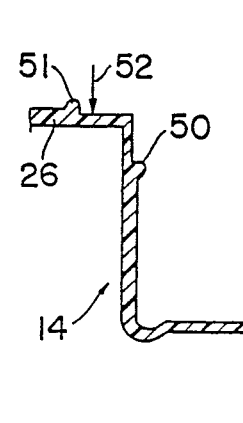

(4) After the basic molding processes have been ended as described above, the sheet 26 is punched out at an inside portion of the rib 51 (as shown by an arrow 52) to thereby obtain an aimed container body 14 (FIG. 34).

The conditions of the rib 51 in a case where the thickness t and the clearance c of the thermoplastic resin sheet 26 used for the molding of the container body 14 in accordance with the molding steps (1) to (4) described above are varied are examined and shown in FIG. 35. Referring to the graph of FIG. 35, in case the thickness t and the clearance c are in a relationship represented by the line O—O, the rib is in a good condition and the relationship is expressed as follows.

$$0.1 \leq t - c \leq 0.3 \text{ (mm)}$$

Namely, it is desired that the subtracted value (t-c) is ranged between 0.1 and 0.3 mm. In this case, when the height $h_1$ of the rib 50 and the thickness $h_2$ of the side wall of the container at an upper portion of the rib is in the relationship $h_1 = h_2$, a container body 14 obtained provides an excellent rigidity and formability or moldability.

Figure 35:
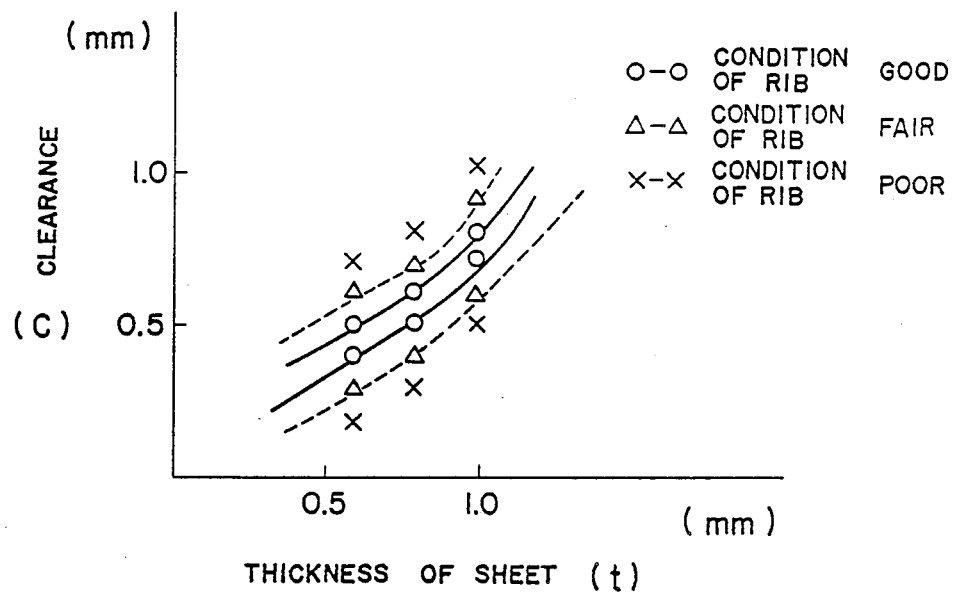
Figure 36:
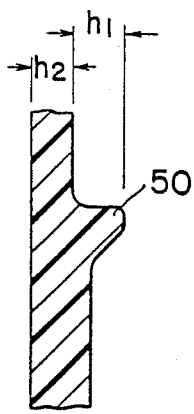

In case the thickness t of the sheet is large and the clearance c is small, the relationship between the $h_1$ and $h_2$ is made $h_1 > h_2$ in the lower area below the line X-X in FIG. 35, and in case the rib height $h_1$ is greatly larger than the thickness $h_2$ of the flange side portion, the rigidity of the container is inferior and the shape of the rib is deformed when a large amount of resin is extruded at the time of the rib formation. On the other hand, in case the sheet thickness t is small and the clearance c is large, i.e. in the area upper than the line X-X in FIG. 35, the relationship between the $h_1$ and $h_2$ is made $h_2 \geq h_1$; that is the thickness $h_2$ of the flange side portion is made large and the rib height $h_1$ is made small. In this case it is impossible to endow with a sufficient rigidity to the container.

Figure 37:
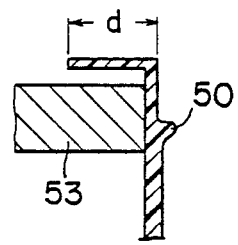
Figure 38:
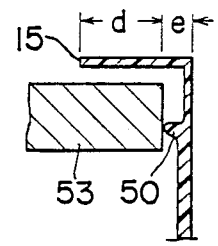

According to this embodiment, the rib 50 may be located on the inside surface of the container body 14 to reduce the width of the flanged portion in the heat sealing time. As shown in FIGS. 37 and 38, when the rib 50 is located on the outside surface of the container to ensure the identical sheet seal width d, the rib 50 abuts against a retainer of the heat seal, which results in the necessity of the enlargement of the width d by the amount e of the rib component. However, this necessity can be neglected by locating the rib 50 on the inside surface of the container.

In the manufacturing of the container body 14 according to this embodiment, a further rib 51 may be preferably formed, and the surface of the flanged portion is made stable and smooth by pressing the flanged portion 15 of the container body 14 by the stepped portion b of the plug 19, thus ensuring the heat seal of the peripheral edge of the metallic cover.

7-2 Examples

The container with a metallic cover according to this embodiment will be described by way of examples.

(Example 7-2-1)

A molding working of a sheet blank (polystyrene) having a thickness of 1.2 mm was carried out by utilizing a cap-shaped cavity having a diameter 60 mm at the upper end portion, a diameter 55 mm of the bottom surface and a depth 60 mm.

A container body 14A was molded by the method described above with the clearance 2c=1.0 mm, and concerning the container body 14A, $h_1$ was 0.5 mm and $h_2$ was 0.4 mm, i.e. the rib height was 0.5 mm.

For the comparison sake, a container body 14B was formed by a conventional molding method, and the thickness $h_2$ of the side wall surface, below the flanged portion 15, of the container body provided with no rib 50 was 0.8 mm.

The comparison of the container body 14A with the container body 14B is shown by the following table, and it was found that the container body 14A was superior in the rigidity against a force applied to the side surface of the container body from the horizontal direction thereof, as well as the sealing stability.

|  | Container 14A | Container 14B |
| --- | --- | --- |
| $h_1$ | 0.5 mm | — |
| $h_2$ | 0.4 mm | 0.8 mm |
| Flange Thickness | 0.8 mm | 1.2 mm |
| Horizontal Rigidity |  | X |
| Sealing Stability |  | X |

7-3 Effects

According to this seventh embodiment, the following effects can be attained.

Since the rib 50 is located circumferentially on the inside surface of the lower portion of the flanged portion 15 of the container body, the container body 14 provides a superior rigidity against the force applied to the side surface of the container body from the horizontal direction thereof and the deformation of the container body 14 can be effectively prevented without changing the thickness of the thermoplastic resin sheet 26 used for the molding working.

Figure 39:
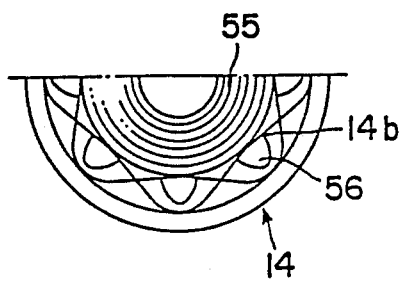
FIGS. 39 and 40 are views showing another example of the container with a metallic cover provided with a container body having ribs.
Figure 40:
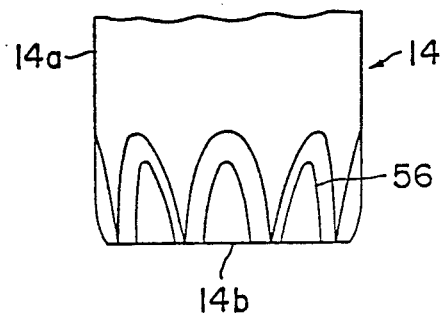

7-4 Another Embodiment of Container Body of Container with Metallic Cover Provided with Rib FIGS. 39 and 40 show another embodiment of the container body of a container with a metallic cover provided with a rib.

FIG. 39 shows the lower half of the bottom view of the container body 14 and FIG. 40 is a side view of the bottom portion thereof. As shown in FIGS. 39 and 40, a plurality of ribs comprising a plurality of concentrically formed annular grooves 55 are formed on the bottom 14b of the container body 14. The lower portion of the body portion 14a of the container body 14 is divided into eight portions to which ribs comprising recessed and protruded portions 56 are respectively disposed.

When the flanged portion 15 of the plastic container body 14 according to this invention is roll-seamed under reduced pressure by the peripheral portion 12 of the metallic cover 11, the recessed part of the recessed and protruded portions 56 of the container body 14a is further drawn in the container body 14 by the reduction of the pressure to thereby suck the pressure reduction, so that the deformation of the container body 14 due to the pressure reduction can be effectively prevented. On the other hand, when the annular grooves 55 are provided on the bottom 14b of the container body 14, the bottom portion 14b is drawn in the interior of the container body by the pressure reduction when the container body is roll-seamed, thus absorbing the pressure reduction to thereby prevent the container body 14 from being deformed.

§8 Eighth Embodiment of Container with Metallic Cover (Container with a metallic cover having characteristics in the shape of a flanged portion thereof)

Figure 41:
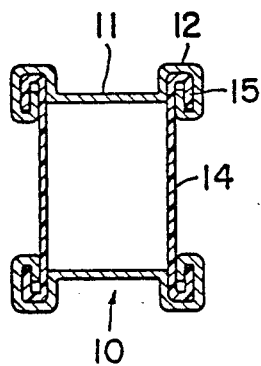
FIGS. 41 and 42 are views showing a container with a metallic cover according to this invention provided with a flanged portion formed by a plastic cylindrical member having both ends widened outwardly.
Figure 42:
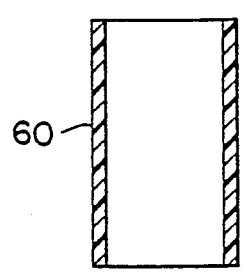
Figure 42:
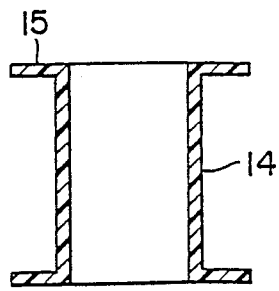

8-1 Basic Structure of Container with Metallic Cover Having Flanged Portion Formed by Outwardly Widening Both Ends of Plastic Cylindrical Member FIGS. 41 and 42 show a container 10 with a metallic cover provided with a flanged portion formed by both ends of a plastic cylindrical member.

As shown in FIG. 41, the container body 14 having the same inner diameters of the upper and lower end portions is made of a plastic material and is provided with upper and lower flanged portions 15 which are roll-seamed by the peripheral portions 12 of the metallic covers 11, respectively. A manufacturing method of such container body 14 will be described hereunder with reference to FIG. 42.

A cylindrical member 60 shown in FIG. 42a is manufactured by fusing and extruding a resin material through a pipe-shaped die, imparting the spherical shape to the extruded resin in a vacuum chamber, and then cooling and cutting the same into cylindrical shape. As the resin material, thermoplastic polyethylene, polypropylene, polystyrene, polyethylene-terephthalate, and the like can be used. The preservation property of the content may be improved by laminating, by a co-extruding method, nylon, vinylidene-chloride copolymer, ethylene-vinyl alcohol copolymer or the like having a good oxygen gas barrier property. In general, in this laminating process, there are many cases in which a resin material constituting a main body and a resin having a gas barrier property are not properly mutually bonded, and in such cases, acid denatured polyolefin, ethylene-vinyl acetate copolymer or the like may be utilized as a bonding layer. Nylon, vinylidene chloride copolymer, or ethylene-vinyl alcohol copolymer may be optionally selectively used in accordance with the degree of the requirement of the gas barrier property with respect to a container. The fused and extruded pipe-shaped resin is cut in round slices each having a predetermined length as a desired cylindrical member 60. In the next step, as shown in FIG. 42b, both end portions of the cylindrical member 60 are widened by a heating mold to form the flanged portions 15. The widening angle is preferably of about 45° with respect to a horizontal plane, and when a soft resin is used, the angle may be made to more than 45°, but when a hard resin is used, it may be preferred to design this angle to be horizontal. The reason for determining the widening angle is based on the prevention of the flanged portions 15 when they are roll-seamed. After the flanged portions 15 are secured to both end portions of the container body 14, one of the flanged portions 15 is first roll-seamed by the peripheral portion 12 of the metallic cover 11, a content is then filled in the container body 14, and the other flanged portion 15 is finally roll-seamed by the peripheral portion 12 of the metallic cover 11.

(Example 8-1-1)

By using a pipe extruding machine for extruding three kinds of materials into five layers, a cylindrical member constructed by polypropylene (350μ)/bonded resin (30μ)/ethylene.vinyl alcohol copolymer (50μ)/bonded resin (30μ)/polypropylene (350μ) was co-extruded so as to have an inner diameter of 65 mmΦ, the thus extruded cylindrical member was cut in round slices each having a length of 83 mm to thereby obtain a cylindrical container body 14. One end portion of the thus formed container body 14 was pressurized by using a heated corn-shaped mold, not shown, to form a flanged portion 15, which was then double seamed with the peripheral portion 12 of a metallic cover 11 for a canned food, called 211, by using a semitron seamer. The container was then reversed and filled with water. The other end was roll-seamed in substantially the same manner. The sealed container was sterilized in the rotemart type retort (manufactured by Stock Company, West Germany) filled with hot water of 120° C. for 30 min. A good result was obtained.

(Example 8-1-2)

A container body 14 was formed by a cylindrical member constructed by a single layer of polyethyleneterephthalate (700 μ), and manufactured in substantially the same manner as that described with reference to the former example (Example 8-1-1) except the above matter. The container body 14 was filled with butter peanut with a dioxidizer added and then sealed. The thus formed container had a rigidity even made by a transparent material and good preservation property was obtained.

(Example 8-1-3)

A container body 14 was constructed by using a laminated material of polyethylene-terephthalate (300μ)/polyallylate (100 μ)/polyethylene-terephthalate (300 μ) and manufactured in substantially the same manner as that described with reference to Example 8-1-1. The thus manufactured container body 14 was worked to form flanged portions, one of which was then roll-seamed with the peripheral portion 12 of a metallic cover 11 and the other of which was also roll-seamed with the peripheral portion of a metallic cover 11 after filling a jelly in the container body 14.

The sealed container was sterilized in a retort at 85° C. for 15 min. A good result was obtained.

For the polyallylate, "U polymer" (registered trade mark, manufactured by YUNICHIKA CO. LTD.) was used.

8-1-4 Effects

According to this embodiment of the invention, by using the cylindrical member 60 which is formed by the method of pipe-extruding, the container body is easily fabricated.

8-2 Basic Structure of Container with Metallic Cover Provided with Half Cut Line Formed above Flanged Portion for Easily Opening Metallic Cover.

Figure 43:
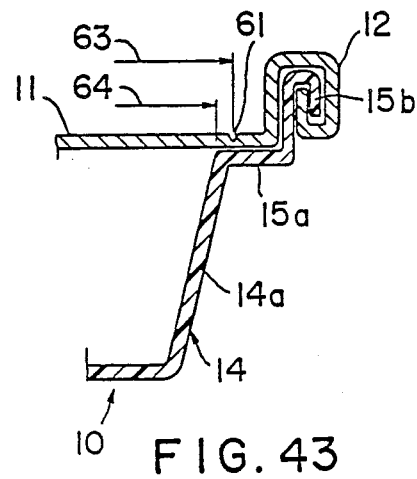
FIG. 43 is a view showing a container with a metallic cover having a flanged portion on which a half-cut line for easy opening of the metallic cover is formed.

FIG. 43 shows a container with a metallic cover provided with a half cut line for easily opening the metallic cover 11 above the flanged portion. The container 10 with the metallic cover is fabricated by roll-seaming the peripheral edge 12 of the metallic cover 11 to the flanged portion 15 of the container body 14 made of plastic material. A half cut line 61 for easily opening the metallic cover 11 is formed on the upper surface thereof at a portion outside the inner periphery of the upper end of the body portion 14a of the container body 14.

The flanged portion 15 is constructed by a stepped portion 15a outwardly extending from the upper end of the body portion 14a of the container body 14 and a roll-seamed portion 15b extending upwardly from the stepped portion 15a.

The metallic cover 11 was constructed by an aluminum plate or tin plate having a thickness of preferably 0.2 to 0.3 mm. It is preferred as occasion demands that the outer surface of the metallic cover 11 is coated with a top coat for the prevention of spots or the like and the inner surface thereof is also coated with an epoxy resin, vinyl resin or the like for the prevention of the corrosion and denaturing of the metallic cover 11 because the inner surface thereof directly contacts a food contained in the container body. The half-cut line 61 on the metallic cover 11 is preferably formed as a line for so-called a full-open type container cover.

The plastic container body 14 may be formed by a thermal molding method such as vacuum molding method after once forming a sheet other than the injection molding method of the thermoplastic resin. The container body 14 may be constructed by a single resin layer or a laminated resin layers formed by optionally laminating resins respectively provided with the gas barrier property, heat-proof property or the like property in accordance with the requirement thereof. As a resin to be utilized, polypropylene, polystyrene, polyethylene-terephthalate, polyvinyl chloride, or the like will be listed up, for example. As resin materials for the laminated layers, will be listed up, for example:

polypropylene/bonded layer/ethylene-vinyl alcohol copolymer/bonded layer/polypropylene;
polystyrene/bonded layer/ethylene-vinyl alcohol copolymer/bonded layer/polystyrene;
polyethylene-terephthalate/polyallylate/polyethylene-terephthalate; or the like.

In a case where the single layered resin material described above is used, the resin material is formed in a film by the T-die method and then thermally formed or formed by a known injection forming method, and in a case where the multi-layered resin material described above is used, the resin material is formed by the co-injection forming method or the thermal forming method after the co-extruding T-die film forming process.

The thus formed container body 14 is filled with a content and then roll-seamed by, for example, means of semi-auto seamer in a single roll or double roll.

According to this embodiment, the half-cut line 61 for the easy open purpose is formed on the upper surface of the metallic cover 11 double seamed on the upper end of the container body 14 at a portion 63 outside of the inner periphery 64 of the upper end portion of the body portion 14a of the container body 14, so that in a case where the metallic cover 11, i.e. container, is opened by pulling a tub, not shown, disposed on the upper surface of the metallic cover 11 to thereby remove a portion inside the half-cut line 61 of the metallic cover 11 covering the upper end of the container body 14, the cut end of the metallic cover 11 roll-seamed around the flanged portion 15 adhering to the container body 14 is positioned outside the inside surface of the upper end of the body portion 14a of the container body 14. Accordingly, in case it is desired to take out the content such as jelly or prin filling the container body 14 on or in a dish by reversing the same, the content does not contact the cut end of the metallic cover 11 and can be easily taken out. In addition, after the opening of the container cover, since the cut end of the metallic cover is positioned on the stepped portion 15a of the flanged portion 15 formed continuously to the container body 14, there is no fear of injuring such as fingers of a person with the shape cut-out end of the metallic cover 11.

§9 Methods of Manufacturing Container with Metallic Cover 9-1 Basic Principle

A first embodiment of a method of manufacturing a container with a metallic cover according to this invention will be described hereafter with reference to FIGS. 44 through 50.

Figure 44:
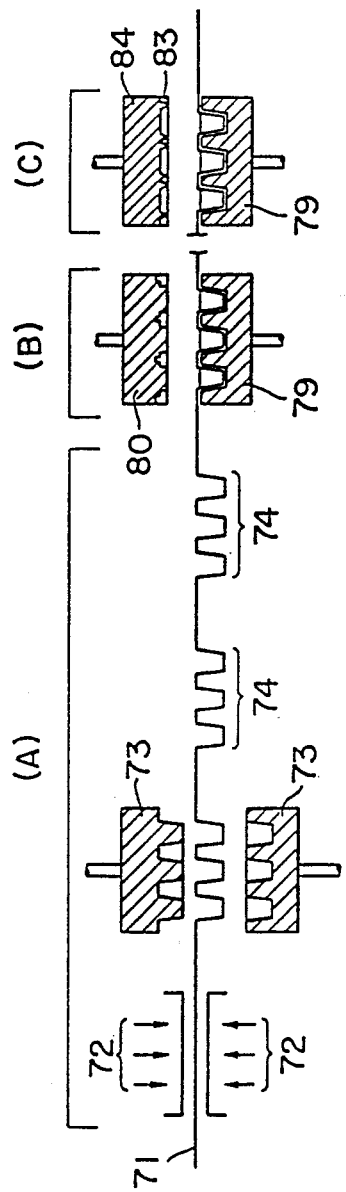
FIGS. 44 to 50 are views showing the first embodiment of the invention for an explanation of the method of manufacturing a container with a metallic cover according to this invention.
Figure 45:
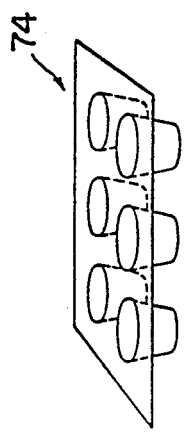

The outline or abstract of the manufacturing processes of the container body 14 will be explained with reference to the illustration of FIG. 44.

Process (A):

A plastic sheet 71 having a thickness necessary for forming a container is heated by heating apparatus 72 by a generally known thermal forming method, and a molded product 74 is then formed by using a mold 73 by a generally known molding method. An air pressure formation or a vacuum formation method, or a combination of these methods is applied for the formation method described above. The cross section of one container body 14 obtained as the molded product 74 has a thickness and strength sufficient for withstanding the pressure applied at the double seaming time with respect to the body portion 14a and the bottom portion 14b, but with respect to the flanged portion 15, since the thickness $t_6$ thereof is considerably large, the thickness is not suitable for the double seaming operation. The container body 14 has an inner diameter $l_6$ and an axial height h.

A plastic laminated sheet having a structure constructed so as to reduce a transmission rate of an oxygen gas or water vapor as a plastic sheet 71 for forming the container body 14 when a container for preserving food is manufactured. As the food preserving container, it will be required that the oxygen gas barrier property of the container is less than 0.8 cc/100 cc; 24 hrs. atm. (20° C., 90% RH) and the $H_2O$ barrier property is less than 0.2 g/100 cc; 24 hrs. atm. (40° C., 90% RH).

Process (B)

The molded product 74 formed in the process (A) is thermally pressed so as to make the thickness $t_6$ of the flanged portion thin and improve the precision thereof Namely, the molded container body 14 is placed in the cavity 79 of the mold as shown in FIG. 47a. The interior of the cavity 79 is preliminarily heated and the wall surface thereof is treated by a working such as Teflon working to further improve the releasing of the product from the mold cavity. A heated plug 80 is then lowered to crush the flanged portion 15 (as shown in FIG. 47b), the plug 80 being driven by hydraulic means or pneumatic means.

The plug 80 is raised when the flanged portion 15 has been pressed so as to have a predetermined thickness, and pressing operation has been completed. The flanged portion 15 has preferably a thickness $t_7$ of 0.25 to 0.9 mm. Regarding a general clearance during the thermopress forming operation, the thickness $t_7$ of the flanged portion 15 and the thickness of the lower portion 81 of the flange 15 are set respectively to 0.5 mm and to 0.8 mm.

As shown in FIGS. 47a and 47b, a printed label 82 is fused and secured to the body portion 14a or bottom portion 14b of the container body below the flanged portion 15 at the above mentioned pressing process by inserting the printed label 82 into the cavity 79 together with the formation of the flanged portion. The label 82 is fused and secured to the container body 14 by positioning the resin of the same material as that of the previously formed container body or a thermally fusible layer in the inner layer of the label 82.

Process (C)

Figure 48:
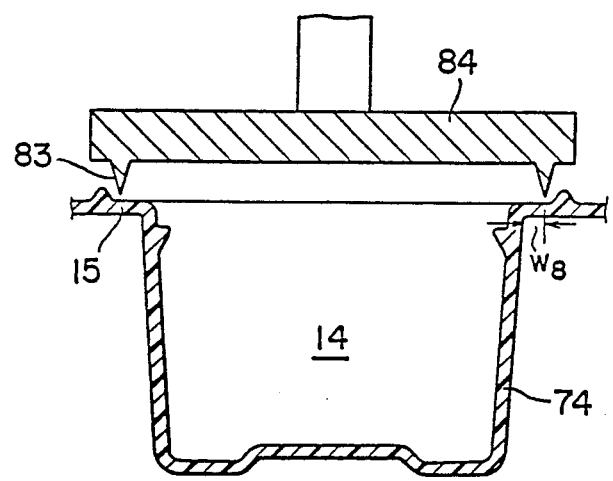
Figure 49:
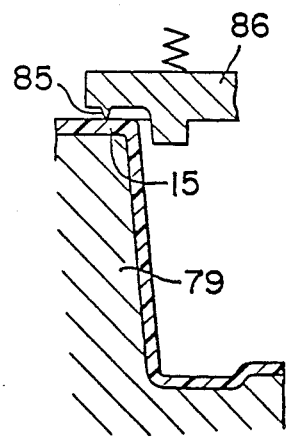

The molded product 74 provided with the flanged portion 15 having a thickness adjusted so as to have a predetermined value, as shown in FIG. 48 by the process (B), is punched out by a plug 84 having a blade 83 so that the width $w_8$ of the flanged portion 15 is to be a predetermined value, being generally 1.0 to 2.5 mm. This punching process may be carried out during the process (B). That is, as shown in FIG. 49, the processes (B) and (C) are simultaneously carried out by utilizing a plug 86 provided with a pressing surface on which a blade 85 is formed, thus manufacturing a container body as an aimed product.

The peripheral portion of the metallic cover is roll-seamed around the thus formed flanged portion of the container body to seam the same to thereby form a container with a metallic cover.

Figure 50:
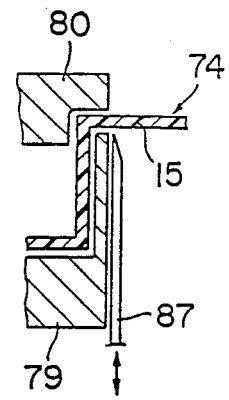

The flanged portion 15 may be cut out from the molded product 74 by the following method. That is, as shown in FIG. 50, the mold product 74 is placed between the cavity 79 and the plug 80 which have the same outer diameters and heat-pressed to form the flanged portion 15 so as to have a predetermined thickness. After that a shearing blade 87 is moved upwardly along the outer wall of the cavity 79 to carry out the cutting operation. According to this method, the product 74 is placed between the cavity 79 and the plug 80 which have the same diameters, so that the flanged portion 15 can be cut out with high precision.

9-2 Example (Example 9-2-1)

Figure 46:
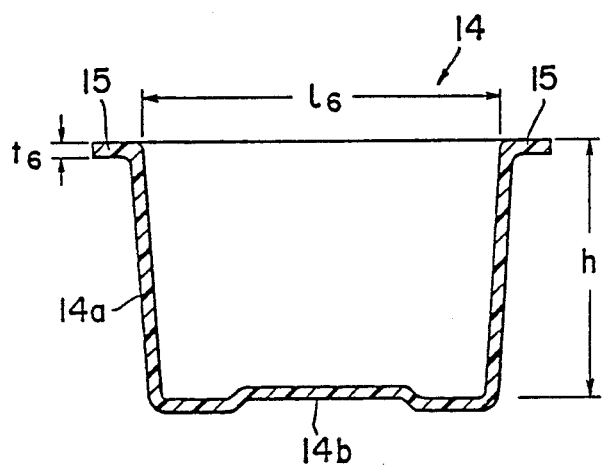
Figure 47:
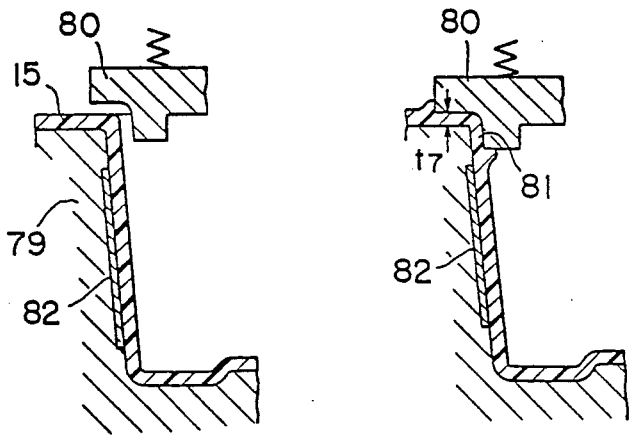

A container was heat-formed by using a laminated sheet constructed by polypropylene/bonded layer//ethylene-vinylalcohol copolymer/bonded layer/polypropylene respectively having thicknesses 640$\mu$/40$\mu$/40$\mu$//40$\mu$/640$\mu$, totally 1400$\mu$, and respective dimensions are, as shown in FIG. 46, $l_6$=65 mm, h=30.0 mm and $t_6$=1300$\mu$. The formation of the container was carried out by the plug-assist compressed air formation.

A thermal pressing operation was then performed to form the flanged portion having a thickness $t_7$ of 500$\mu$, and at the same time, a lavel 82 formed by laminating printed polyethylene-terephthalate/polypropylene/-polypropylene (cast) respectively having thicknesses of 12$\mu$/100$\mu$/60$\mu$ was inserted into a mold and fused to secure the label 82 to the body portion 14a of the container body 14.

The container body 14 having the flanged portion 15 having a thickness adjusted to a predetermined value was punched out so as to have a flange width $w_8$ of 2.0 mm. The thus obtained container body 14 was filled with water and the peripheral portion of the metallic cover was double seamed around the flanged portion of the container by means of a seamer. The container was then placed in a retort for sterilization sake at 120° C. for 30 min. The container was not deformed and the content could be maintained with no change, thus obtaining good results.

9-3 Effects

According to this manufacturing method, the following effects are attained.

Since the container body 14 is formed from the laminated sheet obtained by a thermally forming method and the flanged portion 15 is then processed by a pressing heat formation method only so as to obtain the thickness thereof suitable for the double roll-seaming working, this method is applicable to the mass production of the container provided with the flanged portion having thickness set optionally and precisely.

9-4 Other Embodiments of Manufacturing Methods of Container with Metallic Cover

Another embodiment of the method of manufacturing a container with a metallic cover will be explained with reference to FIGS. 51a, 51b and 51c.

The method of this embodiment is described in accordance with the process sequence.

Figure 51:
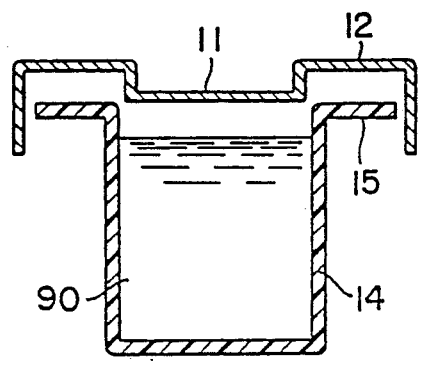
FIGS. 51a, 51b and 51c are views showing another embodiment of the method of manufacturing a container with a metallic cover according to this invention.
Figure 51:
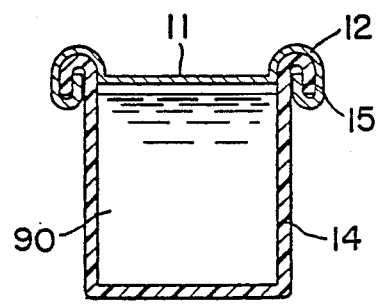
Figure 51:
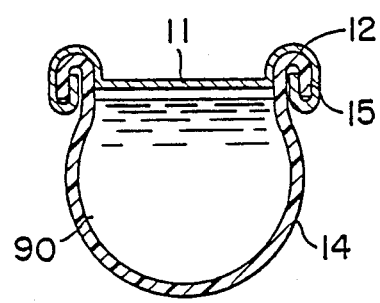

A plastic container body 14 provided with a flanged portion shown in FIG. 51a is made of a thermoplastic resin by a known method such as sheeting, thermally forming, or injection molding method. In order to improve the gas barrier property and the heat-proof property, there is used a laminated sheet of multiple layers constructed by a resin having a high gas barrier property such as ethylene-vinyl alcohol copolymer, vinylidene chloride copolymer, or nylon and a resin having a good heat-proof property such as polyallylate. As typical examples of such a laminated sheet are listed layers of polypropylene/bonded layer/ethylene vinyl alcohol copolymer/bonded layer/polypropylene; and polyethylene-terephthalate/polyallylate/polyethyleneterephthalate. In this case, the container body 14 is formed by thermally forming a sheet which is obtained by a laminated layer or multiple layer co-extruding method. In a case of the container body 14 made of single layer of a plastic material, an injection molding method will be applicable instead of the thermal forming method (Process I). In the next step, as shown in FIG. 51b, the container body 14 is filled with a content 90 and the flanged portion 15 is roll-seamed with the peripheral portion 12 of the metallic cover 11 (Process II). A semi-auto seamer or an O-type seamer such as used for roll-seaming a can is utilized as a seaming machine, and single or double seaming working can be adopted. Next, as shown in FIG. 51c, a heat treatment is carried out after roll-seaming working to obtain a bowl-shaped container body 14 according to this invention (Process III).

The adjustment of the temperature in the heat treating process is a matter of importance. The heat treatment is performed at a temperature more than the glass transition point of the plastic material constituting the container body 14 and below the melting point thereof. For example, with the container body 14 made of polyethylene-terephthalate, the container body 14 is softened by treating with hot water having a temperature more than 80° C. at a temperature more than the glass transition point ($T_G = 81°$ C.) of the polyethylene-terephthalate. At this stage, the rigidity of the container body 14 itself remains to a certain extent, thus the container body 14 being not broken. At this state, to the container body 14 is applied a force acting so as to maximumly reduce the whole surface area of the container body 14 and the container body 14 is not thus deformed in the spherical shape. In case the temperature rises above the melting point, the container body 14 will be broken.

(EXAMPLE 9-4-1)

A polyethylene-terephthalate film having a thickness of 1000μ was formed by the T-die method and the film is formed by the vacuum pressure method into a container having an inner diameter of 66 mm, a depth of 30 mm and a flanged portion having a width of 1.8 mm. The container was fully filled with water (100 cc) and double seamed by means of the semitron seamer. The container was then sterilized in the hot water type retort pot (manufactured by Stock Company in West Germany) at a temperature of 85° C. for 30 min. and a container body taken out therefrom after cooling has substantially a spherical shape as shown in FIG. 51c.

(EXAMPLE 9-4-2)

A container body having substantially a spherical shape as shown in FIG. 51c was obtained by performing substantially identical treatment carried out with respect to the Example 9-4-1 except that a laminated sheet of polyethylene-terephthalate (500μ)/polyallylate (100μ)/polyethylene-terephthalate (500μ) was used and heated at a temperature of 115° C. for 30 min.

(EXAMPLE 9-4-3)

A container body having substantially semi-spherical shape was obtained by performing substantially the identical treatment carried out with respect to the Example 9-4-1 except that a laminated sheet of two-axis elongation polystyrene (500μ)/bonded layer (30μ)/ethylene-vinyl alcohol copolymer (50μ)/bonded layer (30μ)/two-axis elongated polystyrene (500μ) was used and heated at a temperature of 80° C. for 30 min. after the double seaming working.

9-4-4 Effects

According to this embodiment, a container body 14 having substantially a spherical shape which was hardly obtained by the conventional manufacturing method can be manufactured by extremely easy processes. A leg portion formed by a separate process may be secured to the container body 14 as a container with leg portion, which gives a good appearance in design. In addition, by constructing the cover as a full-open end type, the content 90 of the container can be easily taken out therefrom as it is and the content transferred on a dish as it is will maintain a good appearance.

§10 Apparatus for Manufacturing Container with Metallic Cover (Container Body Formation Mold)

10-1 Basic Principle

An apparatus for manufacturing a container with a metallic cover according to this invention will be described hereunder with reference to an embodiment shown in FIG. 19 and FIGS. 52 to 54.

Processes for manufacturing a plastic container body 14 to be roll-seamed and sealed with a metallic cover by a thermal formation based on the plug assist method are first described with reference to FIG. 19.

(1) The cavity 17 having an upper edge portion 42 upwardly extending from the upper end 41 of the outer periphery of the cavity is raised and the clamp 21 is lowered at the same time with respect to the heated sheet 38.
(2) The sheet 38 is clamped between the upper edge portion 42 and lowering clamp 21, and the plug 19 is then lowered into the cavity 17.
(3) The sheet 38 is pressed into the cavity 17 by lowering the plug 19 and the sheet 38 is sucked into the cavity 17 by the vacuum pressure means 43. In this process, a thickness $t_4$ of a portion of the sheet 38 which is formed as the flanged portion of a container is made thin in comparison with a thickness $t_3$ of the other portion of the sheet 38. As described above, in order to form the flanged portion capable of being double seamed, it is important to make thin the thickness of the flanged portion $t_4$ in comparison with the thickness $t_3$ of the sheet 38 and the thicknesses of the side portion and the bottom portion of the container body 14. According to this embodiment, the thickness $t_4$ of the flanged portion 15 could be made to a value suitable for the double seaming process by selecting, in preferred ranges, an inclination angle $\theta$ of the upper edge portion 42 of the cavity 17 upwardly extending and a distance l between the upper end 41 of the outer periphery of the cavity and the inner peripheral surface of the clamp 21.

Figure 52:
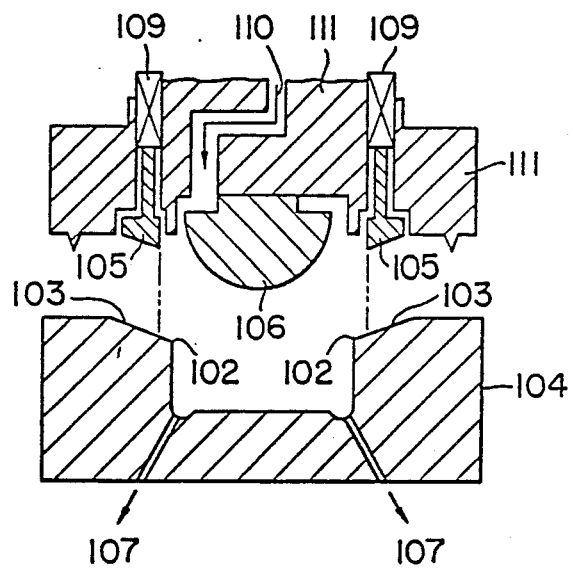

A first example of the whole structure of a mold is shown in FIG. 52. In this example, an individual clamp 105 is driven by a cylinder assembly 109 to clamp the sheet between the clamp 105 and the upper edge portion 103 of a cavity 104. A plug 106 is then lowered and the plug 106 is integrally formed with a mold 111. Compressed air is blown through a port 110 and vacuum-exhausted through a port 107. The cavity 104 has an outer peripheral upper end 102.

Figure 53:
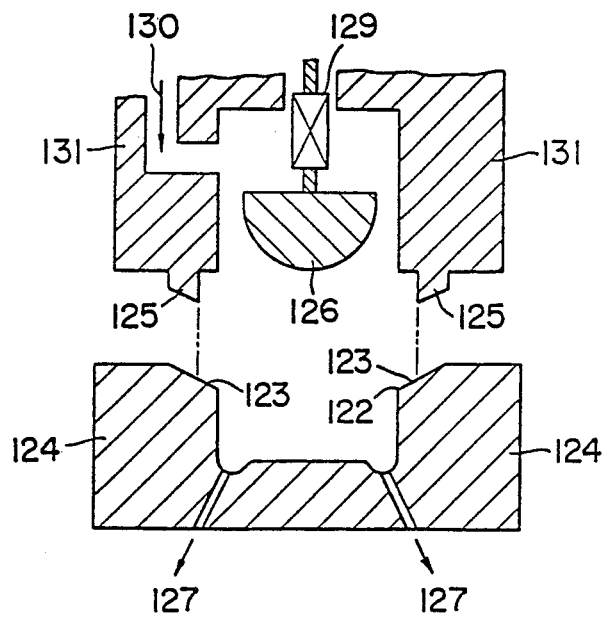

Referring to FIG. 53 showing a second embodiment of the mold, a clamp 125 is formed as a member of a mold 131. When the mold is closed, the sheet is clamped between the clamp 125 and the upper edge portion 123 of the cavity 124. A plug 126 is then driven by a cylinder assembly 129 to press the sheet against the cavity 124. Compressed air 130 is blown and exhausted through a port 127. In either one of the first and second embodiments, it may be required for the plug to press the sheet into the cavity by lowering the plug after clamping the sheet.

In experiments in the use of the mold of the above first embodiment and a polypropylene sheet having a thickness $t_3$ of 1.3 mm, the relationships between the inclination $\theta$ of the upper edge portion of the cavity, the distance l between the outer peripheral upper end and the inner peripheral surface of the clamp, and the thickness $t_4$ of the flanged portion of the container body are shown in FIG. 54. The thickness $t_4$ of the flanged portion suitable for being roll-seamed is generally ranged in 0.4 mm < $t_4$ < 0.7 mm. In the graph of FIG. 54, the preferred range L of the distance l corresponding to the range D of the thickness $t_4$ is in 5 mm < 20 mm and the preferred range of the inclination $\theta$ corresponding thereto is in 5° < $\theta$ < 40°. The curves A to G in the graph were obtained in accordance with the measurements by using the cavities with the inclinations $\theta$ set as follows:

| Curves | A | B | C | D | E | F | G |
| --- | --- | --- | --- | --- | --- | --- | --- |
| $\theta(°)$ | 0 | 5 | 10 | 20 | 30 | 40 | 50 |

A formed plastic container body has a ratio Y/X=2 (X:Depth; Y:Diameter), and in order to form a container having a strength withstanding the usual double seaming process, it is desired to make the thickness $t_3$ of the sheet to 1.0 to 1.6 mm. Accordingly, a container having the thickness $t_4$ (0.4 < d < 0.7) of the flanged portion suitable for the double seaming process can be formed by using the mold having the inclination $\theta$ and the distance l of the values in the ranges described above, respectively.

10-2 EXAMPLE

A polypropylene sheet having a thickness $t_3$ of 1.3 mm was molded by using the mold shown in FIG. 52 so as to have the inclination $\theta$ of 20° and the distance L of 10 mm, and a plastic container provided with a flanged portion having a thickness $t_4$ of 0.5 mm was obtained. The peripheral edge portion 12 of the metallic cover 11 was roll-seamed around the flanged portion 15 of the container body 14, which was then filled with meat sauce. The container was sterilized in the retort at a temperature of 125° C. for 30 min. The container was not deformed, thus obtaining a plastic can having a good preservation property.

10-4 Effects

The following effects are attained by this manufacturing apparatus.

(1) A container body provided with a flanged portion having a thickness $t_4$ of 0.4 mm to 0.7 mm is formed by thermally forming a plastic sheet having a thickness $t_3$ of 1.0 to 1.6 mm in use of the mold according to this invention. A container provided with a metallic cover can be easily manufactured by double seaming the peripheral edge portion 12 of the metallic cover 11.

(2) According to this embodiment, the thickness of the flanged portion 15 can be made thin by using only one mold, so that a lot of plastic container bodies can be manufactured at a low cost.

Industrial Usage

A container provided with a metallic cover according to this invention can be used as a food packing container for packing various kinds of foods such as juice, soft drinks, jam, dry foods and the like.

We claim:

1. A method of manufacturing a container with a metallic cover comprising the steps of applying as a coating a heat sealing compound (13) including more than one kind of a denatured polyolefin, an ionomer resin, and an ethylene-acrylic acid copolymer onto an inner surface of a peripheral edge (12) of a metallic cover (11), roll-seaming the metallic cover (11) around a flanged portion (15) of a plastic container body (14), and fusing the flanged portion (15) and the peripheral edge (12) of the metallic cover (11) by heating the same with high frequencies, ultrasonic waves, electrical heating means, or steam to mutually secure the flanged portion (15) and the peripheral edge (12) of the metallic cover (11).

2. A method of manufacturing a container with a metallic cover comprising the steps of filling a plastic container body (14) with a content, sealing the container body (14) by roll-seaming a peripheral edge (12) of a metallic cover (11) around a flanged portion (15) of the container body (14), and heating the container body (14) at a temperature above a glass transition point and below a melting point of the container body (14) so as to form the container body (14) in substantially a spherical shape.

3. A method of manufacturing a container with a metallic cover comprising the steps of:
preparing a sheet blank including a polyethylene-terephthalate layer containing a crystallization promoting nucleus;
thermally forming, by an air or vacuum pressure formation technique, a container body with the thus prepared sheet blank, so that the degree of crystallization of the polyethylene-terephthalate layer is 10–40%; and roll-seaming a metallic cover around a flanged portion of the container body.

4. The method of claim 33, wherein the sheet blank has a layered structure including a polyethylene-terephthalate layer and an olefin layer containing a crystallization promoting nucleus.

5. The method of claim 3, wherein the sheet blank has a layered structure including a polyethylene-terephthalate layer, an olefin layer, and an ethylene-vinyl alcohol copolymer layer containing a crystallization promoting nucleus.

6. A method of manufacturing a container with a metallic cover comprising the steps of:
thermally forming a plastic container body having a flanged portion in a sheet forming process by an air or vacuum pressure formation technique;
thermally press-forming the flanged portion to decrease the thickness thereof;
punching out a peripheral edge portion of the flanged portion so that the flanged portion has a constant flange width; and
roll-seaming a peripheral edge of a metallic cover around the thus formed flanged portion.

7. The method of claim 6, wherein a label is inserted into a mold when the container body is thermally formed by an air or vacuum pressure formation technique, and the label is then bonded to the body portion of the container body.

8. The method of claim 6, wherein a thickness of the flanged portion is decreased to 0.25–0.9 mm during the thermal press formation step and a width of the flanged portion is decreased to 1.0–2.5 mm during the punching out step.

9. An apparatus for manufacturing a container with a metallic cover comprising a cavity structure (104, 124) provided with an upper edge portion (103, 123) upwardly extending from an upper end (102, 122) of an outer periphery of the cavity structure, a plug (106, 126) for pressing a plastic sheet into the cavity (104, 124), and a clamp (105, 125) for abutting against the upper edge portions (103, 123) of the cavity for clamping the plastic sheet, the upper edge portion (103, 123) of the cavity (104, 124) upwardly extending with an inclination of $5°<\theta<40°$, and the distance between the upper end (102, 122) of the outer periphery of the cavity structure and the inner peripheral surface of the clamp (105, 125) being representable by $5 mm<1<10 mm$.

10. A container with a metallic cover comprising a container body having a plastic flanged portion, and a metallic cover having a peripheral edge which is roll-seamed around and with the flanged portion, wherein at least an inner surface of the peripheral edge of the metallic cover is coated with a heat sealing compound, through which the flanged portion and the peripheral edge of the metallic cover are fused and bonded together.

11. A container with a metallic cover comprising: a plastic container body comprising a body portion, a bottom portion, a sheet blank having a gas barrier property substantially disposed around said body portion and said bottom portion, and a flanged portion extending from said container body portion, said flanged portion having a length in a range of 1.0–2.5 mm and a thickness in a range of 0.25–0.9 mm; and
a metallic cover having a peripheral edge which is roll-seamed around and with said flanged portion; wherein said flanged portion is capable of being double seamed with said metallic cover.

12. A container with a metallic cover comprising:
a plastic container body comprising a body portion, a bottom portion, a sheet blank having a gas barrier property substantially disposed around said body portion and said bottom portion, and a flanged portion extending from said container body portion; and
a metallic cover having a peripheral edge which is roll-seamed around and with said flanged portion; wherein when the flanged portion of the container body is double seamed and sealed with the metallic cover, and the container has a gas barrier property of less than 0.8 cc/100 cc, 24 hrs, atm (20° C., 90% RH) and a water vapor ($H_2O$) gas barrier property of less than 0.2 g/100 cc, 24 hrs, atm (40° C., 90% RH).

13. A container with a metallic cover comprising a container body having a plastic flanged portion and a metallic cover said flanged portion, wherein the container body is molded of a plastic sheet blank including a polyethylene-terephthalate layer and an olefin layer having a degree of crystallization of 10–40% by an air or vacuum pressure formation technique.

14. A container with a metallic cover comprising a container body having a plastic flanged portion and a metallic cover having a peripheral edge which is roll-seamed around and with said flanged portion, wherein the container body is molded of a plastic sheet blank including a polyethylene-terephthalate layer, an olefin layer and an ethylene-vinyl alcohol copolymer layer having a degree of crystallization of 10–40% by an air or vacuum pressure formation technique.

15. A container with a metallic cover comprising
a container body having plastic flanged portion, said container body being formed of a plastic material prepared by thermally forming a laminated sheet of a polyethylene-terephthalate and a polyallylate; and
a metallic cover having a peripheral edge which is roll-seamed around and with the flanged portion.

16. The container of claim 15, wherein the laminated sheet of polyethylene-terephthalate and the polyallylate has a layered structure of polyethylene-terephthalate/polyallylate.

17. The container of claim 16, wherein the ratio of the thickness of the polyethylene-terephthalate with respect to the thickness of the polyallylate constituting the layers of the laminated sheet is 15:1 to 5:1.

18. The container of claim 15, wherein the laminated sheet of the polyethylene-terephthalate and the polyallylate has a layered structure of polyethylene-terephthalate/polyallylate/polyethylene-terephthalate.

19. The container of claim 15, wherein the laminated sheet of the polyethylene-terephthalate and the polyallylate has a layered structure of polyallylate-polyethylene-terephthalate/polyallylate.

20. A container with a metallic cover comprising:
a container body having a body portion and a bottom portion which are formed by thermally forming a laminated sheet, and a plastic flanged portion extending from the container body portion which is formed by an insert injection method performed along a peripheral edge of an upper end of the container body portion; and
a metallic cover having a peripheral edge which is roll-shaped around and with the flanged portion.

21. The container of claim 20, wherein the laminated sheet has at least one layer having an oxygen transmission coefficient of less than $5\times10^9$ and an outermost layer of polypropylene having a gas barrier property, and the flanged portion is formed by injecting the polypropylene.

22. The container of claim 20, wherein the laminated sheet includes at least one layer having an oxygen transmission coefficient of less than $5\times10^9$, an outermost layer of polyethylene-terephthalate having a gas barrier property, and the flanged portion is formed by injecting the polyethylene-terephthalate.

23. A container with a metallic cover comprising:
a plastic container having a body portion with a plastic flanged portion extending from an upper portion thereof, and an annular rib formed on an inner wall of the container body at a distance $h_1$ below the flanged portion, wherein the distance $h_1$ and the thickness $h_2$ of the container body on which the rib is provided have the relationship $|h_1-h_2|\leq 0.3$ mm; and
a metallic cover having a peripheral edge which is roll-seamed around and with the flanged portion.

24. A container with a metallic cover comprising:
a container body having a first plastic flanged, stepped portion which outwardly extends from an upper end of the container body and a second flanged portion which upwardly extends from the first flanged, stepped portion; and
a metallic cover having a peripheral edge which is roll-sealed around and with the second flanged portion, said metallic cover having a half-cut line formed therein for facilitating easy access into the container through the metallic cover;
wherein said half-cut line is formed on the metallic cover a position above said first plastic flanged, stepped portion and at a position spaced outwardly from an inner periphery of said upper end of the container body portion.

* * * * *